US008879839B2

(12) United States Patent
Ishida et al.

(10) Patent No.: US 8,879,839 B2
(45) Date of Patent: Nov. 4, 2014

(54) IMAGE PROCESSING APPARATUS, IMAGE PROCESSING METHOD, AND STORAGE MEDIUM

(71) Applicant: Canon Kabushiki Kaisha, Tokyo (JP)

(72) Inventors: Yoshihiro Ishida, Yokohama (JP); Yuichi Tsunematsu, West Kowloom (HK)

(73) Assignee: Canon Kabushiki Kaisha, Tokyo (JP)

( * ) Notice: Subject to any disclaimer, the term of this patent is extended or adjusted under 35 U.S.C. 154(b) by 85 days.

(21) Appl. No.: 13/688,865

(22) Filed: Nov. 29, 2012

(65) Prior Publication Data

US 2013/0136351 A1 May 30, 2013

(30) Foreign Application Priority Data

Dec. 1, 2011 (JP) ................................ 2011-263422

(51) Int. Cl.
*G06K 9/00* (2006.01)
*B41J 2/165* (2006.01)
*G06K 9/46* (2006.01)

(52) U.S. Cl.
CPC ............ *G06K 9/4652* (2013.01); *B41J 2/1652* (2013.01)
USPC ............ 382/165; 382/162; 382/232; 382/266

(58) Field of Classification Search
CPC ....... G06K 9/46; G06K 9/4652; G06K 9/481; G06T 9/001
USPC .......... 382/162, 165, 232, 242, 266; 348/453; 345/17, 23, 26, 441, 467, 589, 590, 345/605
See application file for complete search history.

(56) References Cited

U.S. PATENT DOCUMENTS

| | | | | |
|---|---|---|---|---|
| 6,266,618 | B1 * | 7/2001 | Ye et al. | 702/10 |
| 2003/0202584 | A1 * | 10/2003 | Marques et al. | 375/240.08 |
| 2007/0160401 | A1 * | 7/2007 | Abe et al. | 400/62 |

* cited by examiner

*Primary Examiner* — Ali Bayat
(74) *Attorney, Agent, or Firm* — Canon U.S.A., Inc. IP Division

(57) ABSTRACT

An image processing apparatus includes a color intersection point determination and contour point extraction unit configured to raster-scan a multivalued image by using a pixel matrix having a predetermined size, to determine whether a target point is a color intersection point for dividing a contour for forming a boundary between pixels having a different value from each other, according to states of a plurality of pixels in the pixel matrix, and to extract a contour point for forming the boundary between the pixels having a different value from each other; and a contour information reconstruction unit configured to, by using color intersection points determined by the color intersection point determination and contour point extraction unit and contour points extracted thereby, generate contour information including contour lines each being sectioned by the color intersection points.

11 Claims, 16 Drawing Sheets

BEFORE FUNCTION APPROXIMATION

AFTER FUNCTION APPROXIMATION

| VECTOR COUNTER | STARTING POINT | | INFLOW VECTOR | OUTFLOW VECTOR | COLOR INTERSECTION POINT FLAG | UNUSED FLAG |
|---|---|---|---|---|---|---|
| | X COORDINATE | Y COORDINATE | | | | |
| r | 2i - 1 | 2j - 1 | r + 1 | r + 2 | FALSE | TRUE |
| r + 1 | 2i - 1 | 2j + 1 | r + 3 | r | FALSE | TRUE |
| r + 2 | 2i + 1 | 2j - 1 | r | r + 3 | FALSE | TRUE |
| r + 3 | 2i + 1 | 2j + 1 | r + 2 | r + 1 | FALSE | TRUE |

| VECTOR COUNTER | STARTING POINT | | INFLOW VECTOR | OUTFLOW VECTOR | COLOR INTERSECTION POINT FLAG | UNUSED FLAG |
|---|---|---|---|---|---|---|
| | X COORDINATE | Y COORDINATE | | | | |
| 0 | 3 | 3 | 3 | 1 | FALSE | TRUE |
| 1 | 11 | 3 | 0 | 2 | FALSE | TRUE |
| 2 | 11 | 5 | 1 | 5 | TRUE | TRUE |
| 3 | 3 | 11 | 4 | 0 | FALSE | TRUE |
| 4 | 5 | 11 | 5 | 3 | TRUE | TRUE |
| 5 | 11 | 11 | 2 | 4 | TRUE | TRUE |

| LINE No. | END POINT COORDINATES | | COORDINATE POINT SEQUENCE |
|---|---|---|---|
| | STARTING POINT | ENDING POINT | |
| 1 | (11, 5) | (11, 11) | (11, 5), (11, 11) |
| 2 | (11, 11) | (5, 11) | (11, 11), (5, 11) |
| 3 | (5, 11) | (11, 5) | (5, 11), (3, 11), (3, 3), (11, 3), (11, 5) |

| REGION No. | LINE No. |
|---|---|
| 1 | LINE 1, LINE 2, LINE 3 |

IMAGE PROCESSING APPARATUS, IMAGE PROCESSING METHOD, AND STORAGE MEDIUM

BACKGROUND OF THE INVENTION

1. Field of the Invention

The present invention relates to a technique for extracting at high speed all of boundaries (vertex boundary lines of pixel boundaries) between different color regions in a predetermined order, from a multivalued image.

2. Description of the Related Art

Techniques related to image vectorization originated from character-related techniques. Since then, a method for contour information extraction (U.S. Pat. No. 6,404,921) and a method for coordinate point sequence function approximation (U.S. Pat. No. 7,873,218) have been proposed. With the increase in the use of vectorization for ordinary illustration images, techniques for applying vectorization processing to diverse types of images, for example, a technique for line image vectorization (U.S. Pat. No. 7,889,938) and a technique for color image vectorization (U.S. Pat. No. 7,623,712) have been proposed.

Vectorized data enables smooth contour expression free from jaggy even after magnification to a desired size. Converting an illustration image having a small number of colors into vector data provides an effect of reduced data size and an advantage of facilitated editing processing by a computer.

Many of characters and line images can be handled as a binary image or a monochrome image (an image in which characters and lines are monochrome and other portions are white (background color)). With such an image, applying function approximation to contours (contours of a character and a line image) extracted for each color-connected region enables obtaining a desirable result of vectorization. A color-connected region (color region) refers to a region composed of connected pixels determined to have an identical color (a region in which pixels having an identical color are connected). On the other hand, many illustration images include more than two colors, causing a problem of handling a boundary line between a plurality of color regions. For example, similar to processing with a binary image, applying function approximation to the contour of each color region detected from a multi-color image enables individually approximating the contour of each of adjacent color regions. In this case, there has been a problem that two different approximated curves are obtained by an approximation error at a common boundary layer portion between adjacent color regions causing gaps and overlaps. Examples of gaps and overlaps are illustrated in FIGS. 3A and 3B. FIG. 3A illustrates exemplary contour shapes of respective color regions extracted from an input image. Assuming that the background white region is not counted, there are three different color regions adjacently existing to other color regions (having boundary lines with other regions). FIG. 3B illustrates a result of applying function approximation to contour information illustrated in FIG. 3A for each individual color region. In this case, gaps and overlaps are produced between color regions.

In consideration of the above-described problem, a vectorization method which does not produce a gap between color regions has been proposed. Japanese Patent Application Laid-Open No. 2006-031245 discusses a technique for tracing as a contour a boundary between pixels having at least a certain color difference, branching the processing each time an intersection of color regions (hereinafter referred to as a color intersection point) is encountered, and repeating a search. Since this technique applies function approximation processing to each partial contour sectioned by color intersection points, and reconnects data that has undergone function approximation to generate vector data of each color region, a common result of function approximation is applied to boundary lines. Therefore, theoretically, neither gap nor overlap arises.

As described in Toriwaki, "Digital Image Processing for Image Understanding (2)", first edition, third printing, ISBN4-7856-2004-8, Shokodo, published on Apr. 20, 1993, pp. 66-79, a boundary line between color regions is extracted by tracing a boundary line between color regions. When each of different color regions is considered as graphics, a boundary line refers to a set of boundaries between a point inside the graphics and a point outside the graphics. As described on page 68 in Toriwaki, "Digital Image Processing for Image Understanding (2)", known boundary line tracing methods are classified into three types: pixel tracing type, edge tracing type, and vertex tracing type. The following descriptions will be made focusing on the vertex tracing type with which a gapless common contour line is defined between adjacent color regions in an image. As a boundary line tracing method of the vertex tracing type, a boundary line tracing method discussed in Japanese Patent Application Laid-Open No. 2006-031245 is known. The boundary line tracing method of this type searches for a search starting point of color regions subjected to extraction, and then traces color boundaries while determining a color region on the right-hand side or left-hand side as a color region subjected to extraction. When a color intersection point is encountered, the method records boundary lines which have been extracted until then and then starts new extraction. The method repeats the above-described processing for tracing color boundaries in this way until all of boundary lines have been extracted.

This method has some problems. First of all, there are some search orders when a color intersection point is encountered (when there is a plurality of search orders, which order is given priority is a problem). Depending on a method for selecting the order of extraction, reconstructing a contour by arranging boundary lines may become difficult, or a boundary line extraction failure may easily occur. Further, since the tracing direction changes by the region shape, there may be a case where memory cache does not work when referring to pixel information in memory, possibly resulting in processing speed reduction.

SUMMARY OF THE INVENTION

A boundary line extraction method without using the above-described procedures for sequentially tracing boundary lines can be considered as discussed in Japanese Patent Application No. 2010-234012. This method first generates a table of linear elements (a linear element is a minimum unit constituting a boundary line) for each color region through raster scanning, and then scans the table to extract a contour. Then, the method traces the contour of an extracted color region to detect a color intersection point composed of the extracted color region and an adjacent color region, and divides the contour for each color intersection point. This method enables solving the above-described problems of boundary line extraction failure and boundary line reconstruction order, and also enables high-speed contours extraction through raster scanning and table scanning. However, to search for a boundary line in consideration of a color intersection point, it is necessary to search for a contour twice, in a similar way to tracing, to retrace the extracted contour. This means that there is a room for further improvement.

The present invention is directed to a method for detecting a color intersection point when extracting a contour point constituting a linear element, and extracting a boundary line by recording color intersection point information together with contour point information.

According to an aspect of the present invention, an image processing apparatus includes a color intersection point determination and contour point extraction unit configured to raster-scan a multivalued image by using a pixel matrix having a predetermined size, to determine whether a target point is a color intersection point for dividing a contour for forming a boundary between pixels having a different value from each other, according to states of a plurality of pixels in the pixel matrix, and to extract a contour point for forming the boundary between the pixels having a different value from each other; and a contour information reconstruction unit configured to, by using color intersection points determined by the color intersection point determination and contour point extraction unit and contour points extracted thereby, generate contour information including contour lines each being sectioned by the color intersection points.

According to an exemplary embodiment of the present invention, a contour point and a color intersection point can be obtained by raster-scanning an image once, enabling high-speed generation of contour information (boundary line) indicating the contour of each region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 2:
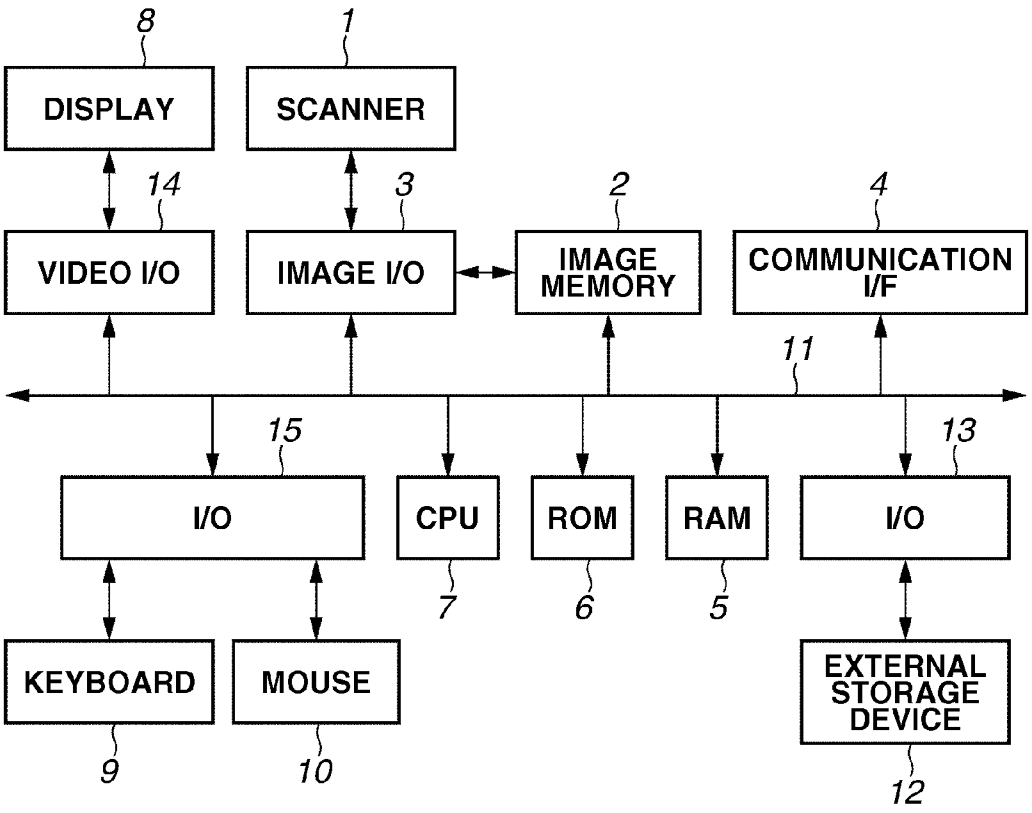
FIG. 2 is a block diagram illustrating the information processing apparatus according to the exemplary embodiment.
Figure 3A:
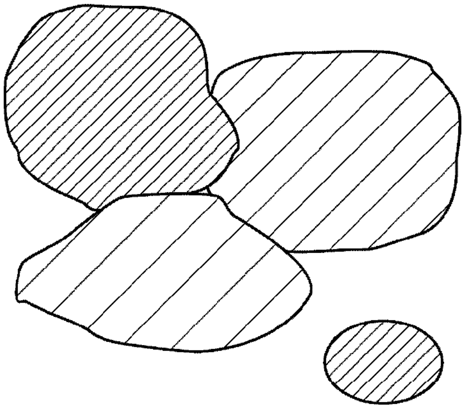
FIGS. 3A and 3B illustrate examples of states where overlaps and gaps are produced between color regions after function approximation.
Figure 3B:
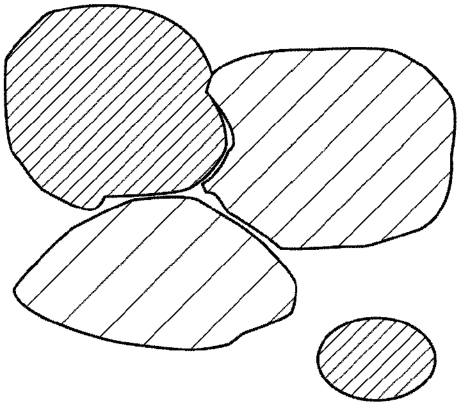

An example of a configuration of an image processing apparatus according to an exemplary embodiment of the present invention will be described below with reference to a block diagram illustrated in FIG. 2. The image processing apparatus according to the present exemplary embodiment can be implemented by using a general-purpose computer. Referring to FIG. 2, a central processing unit (CPU) 7 is a processor for controlling the entire image processing apparatus. A read-only memory (ROM) 6 stores programs and parameters which do not need change. A random access memory (RAM) 5 temporarily stores a program and data supplied from an external device. A scanner 1 photoelectrically scans a document to obtain electronic image data. An image input/output (I/O) 3 is an interface for connecting the image processing apparatus with the scanner 1. An image memory 2 stores the image data scanned by the scanner 1. An external storage device 12 is a stationarily installed storage medium such as a hard disk, a memory card, and an optical disc. An I/O 13 is an interface for connecting the image processing apparatus with the external storage device 12. An I/O 15 is an interface for connecting the image processing apparatus with a pointing device 10 such as a mouse and an input device such as a keyboard 9. A video I/O 14 is an interface for connecting the image processing apparatus with a display unit 8 for displaying data stored in and supplied to the image processing apparatus. A communication interface I/F 4 connects the image processing apparatus to a network line (not illustrated) such as the Internet. A system bus 11 connects each of the above-described units to enable communication therebetween.

Figure 1:
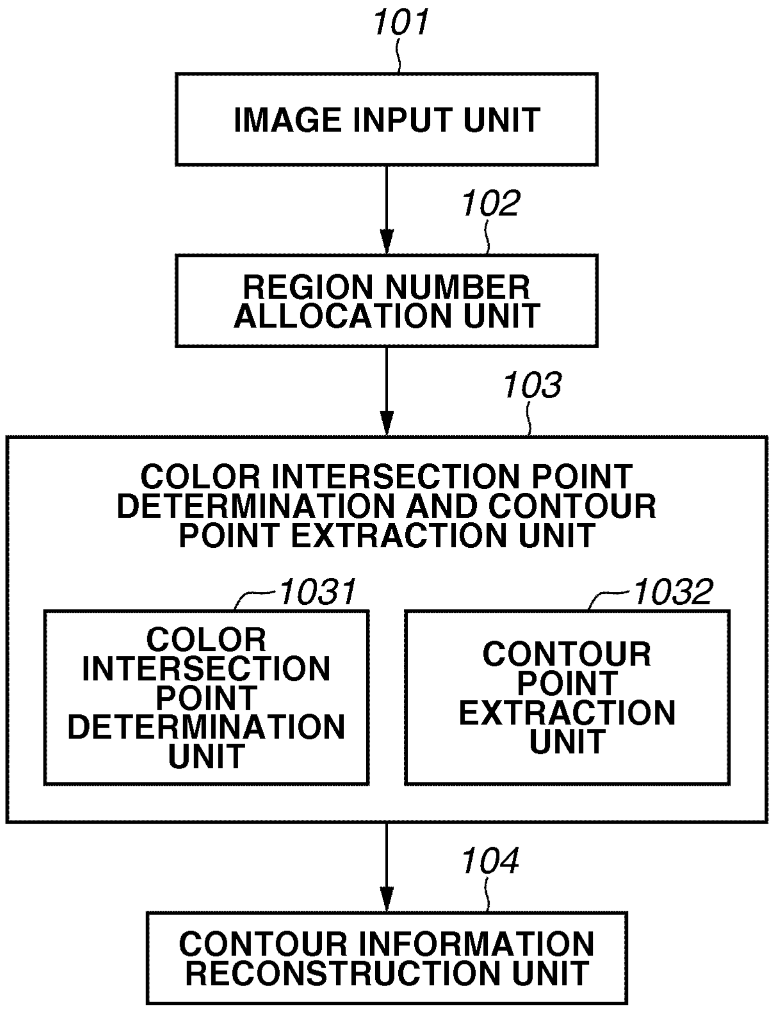
FIG. 1 is a block diagram illustrating main processing performed by an information processing apparatus according to an exemplary embodiment of the present invention.
Figure 4:
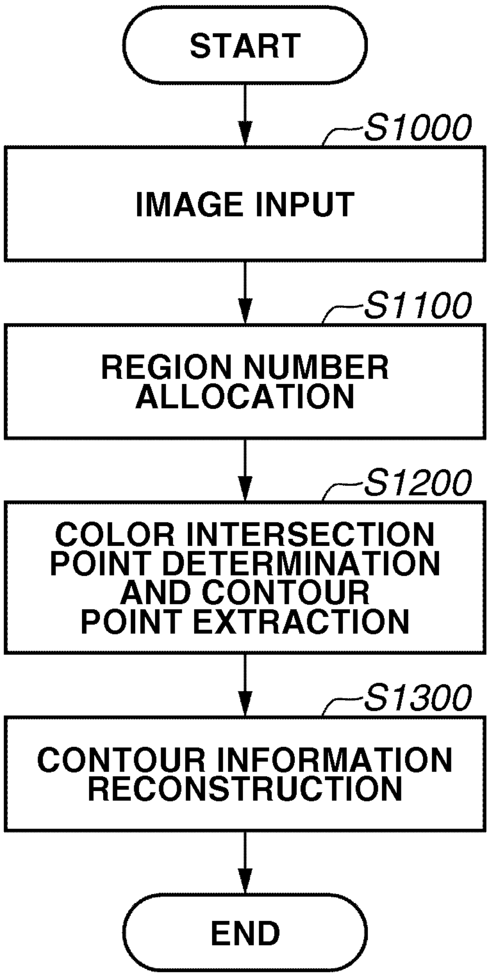
FIG. 4 is a flowchart illustrating processing in an exemplary embodiment.

Procedures for achieving the present exemplary embodiment by using a program executed by the CPU 7 will be described below with reference to the block diagram illustrated in FIG. 1 and the flowchart illustrated in FIG. 4.

When the CPU 7 starts the processing in step S1000, the CPU 7 inputs image data including an image region subjected to processing. The CPU 7 inputs the image data scanned by the scanner 1, to the image memory 2 via the image I/O 3. The CPU 7 may input an image including the above-described image region subjected to processing from the outside of the image processing apparatus via the communication I/F 4, or read image data prestored in the external storage device 12 via the I/O 13. The CPU 7 stores the obtained input image in the image memory 2.

When an input unit such as the scanner 1 is used, noise is superposed on an input image, making it difficult to identify a representative color. In this case, it is desirable to perform color region division processing to group pixels so that pixels having a close pixel value correspond to the same color information. In step S1000, the CPU 7 applies the color region division processing to the input image to enable solving the above-described problem. The CPU 7 may use any type of color region division processing as long as the present invention is applicable. For example, a technique discussed in U.S. Pat. No. 7,623,712 constructs a cluster based on color information acquired from pixels in an input image, and unifies similar clusters and clusters considered to be noise to remove scanning noise. The present exemplary embodiment applies such a technique to eliminate noise produced when a scanned image is input. The above-described processing implements an image input unit 101 illustrated in FIG. 1.

In step S1100, the CPU 7 applies labeling processing (region number (label) allocation processing) to the image data scanned in step S1000 to allocate an identical region number to regions determined to have an identical color in the image data, and then extracts color regions. In consideration of 8-pixel connection, the labeling processing allocates an identical number to a set of pixels in eight pixels adjacently existing (connecting) to the left, right, upside, downside, upper left, lower left, upper right, and upper left of a target pixel, having an identical pixel value. In this case, a number (hereinafter referred to as a region number) for identifying each color region in post-processing is allocated to each pixel constituting each color region. An image that has undergone the labeling processing (region number (label) allocation processing) will be referred to as a labeled image. The labeling processing needs to be performed so as to produce the same connection state as a connection state produced by contour extraction processing to be performed later. The present exemplary embodiment will be described below centering on a case where contour extraction is made on an 8-pixel connection basis. Therefore, the labeling processing is performed on an 8-pixel connection basis, and an identical number will be allocated to a set of pixels in eight pixels adjacently existing to the left, right, upside, downside, upper left, lower left, upper right, and upper left of a target pixel, having an identical pixel value. The processing in step S1100 implements a region number allocation unit 102 illustrated in FIG. 1.

Figure 5A:
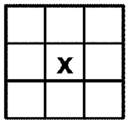
FIGS. 5A and 5B illustrate raster scanning applied to an image by using a 3×3 pixel matrix.
Figure 5B:
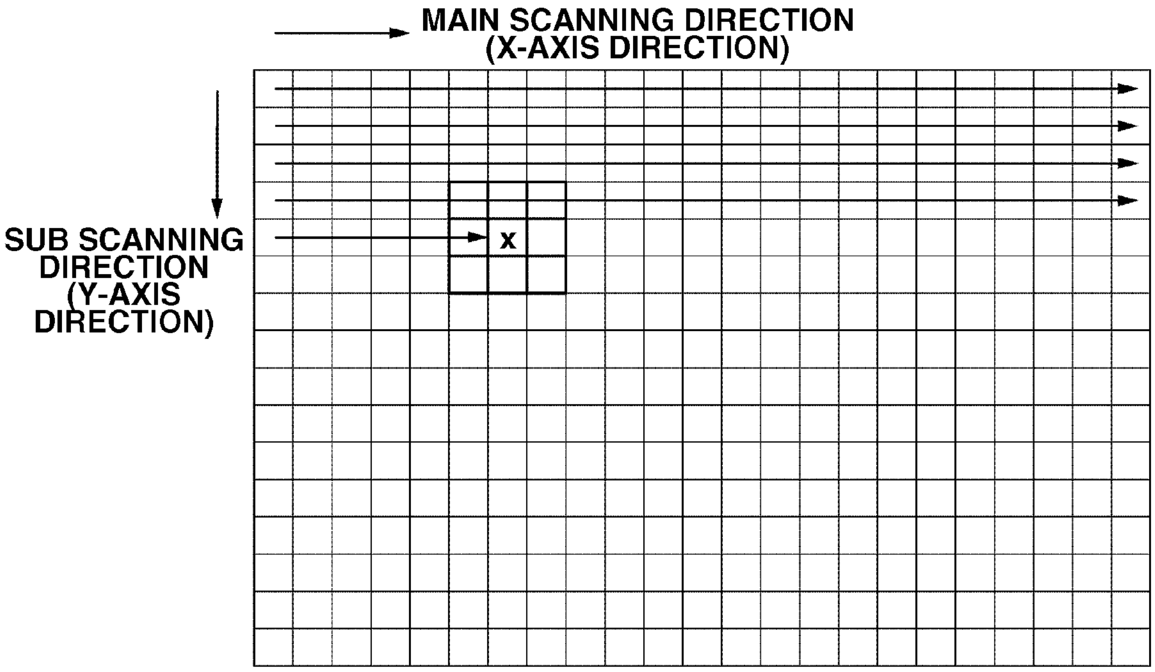

In step S1200, by using the labeled image acquired in step 1100 as an input image, and recognizing the center pixel (indicated by "x" in FIG. 5A) of a 3×3 pixel matrix window illustrated in FIG. 5A as a target pixel, the CPU 7 executes raster scanning starting with the upper left window of the input image as illustrated in FIG. 5B. Then, the CPU 7 executes processing for extracting a position where a horizontal linear element and a vertical linear element constituting a contour of each label change, as a starting point of each linear element (hereinafter also simply referred to as a contour point). In addition, the CPU 7 executes processing for determining whether each of these contour points is a color intersection point (hereinafter referred to as color intersection point determination). When the CPU 7 determines that a color intersection point exists on these linear elements, the CPU 7 applies processing for extracting a contour point which is a color intersection point (hereinafter referred to as contour point extraction processing) to the relevant position. An extracted vertical linear element and horizontal linear element are referred to as a vertical vector and a horizontal vector, respectively. A color intersection point determined to exist on a linear element is a starting point of a new horizontal vector when the linear element is horizontal, or a starting point of a new vertical vector when the linear element is vertical. The contour point extraction processing, the color intersection point determination for a contour point, the color intersection point determination on a linear element, and the contour point extraction processing at a color intersection point position are collectively referred to as color intersection point determination and contour point extraction processing.

In the present exemplary embodiment, a horizontal vector and a vertical vector are extracted so that a label region to which the target pixel belongs comes to the right-hand side in the forward direction. As a result, an extracted outer contour (a contour externally surrounding the label region subjected to contour extraction) is traced in the clockwise direction. An inner contour (an internal contour extracted, along a boundary of holes surrounded by the label region subjected to contour extraction, so that the relevant label region comes to the right-hand side) is traced in the counterclockwise direction. The coordinate system used in the present exemplary embodiment is similar to that used in U.S. Pat. No. 6,404,921. Specifically, the main scanning direction is assigned to the x axis (the right-hand side is the positive side) and the sub scanning direction is assigned to the y axis (the downward side is the positive side), and coordinate values (x- and y-axis values) of each pixel of an input image are represented by integer values. Coordinate values of an extracted starting point of a linear element and a color intersection point are extracted at an intermediate position between pixels. Therefore, doubled coordinate values are extracted as a target coordinate to handle these coordinate values as integer values. Specifically, an m×n pixel image is represented by a 2m×2n positive even number (integer number) so that coordinate values of an extracted starting point of a linear element and a color intersection point are integer values (odd numbers). Hereinafter, the i-th pixel position of the j-th raster is represented by (2i, 2j), where i and j are positive integers, and $i \le m$ and $j \le n$.

Figure 6:
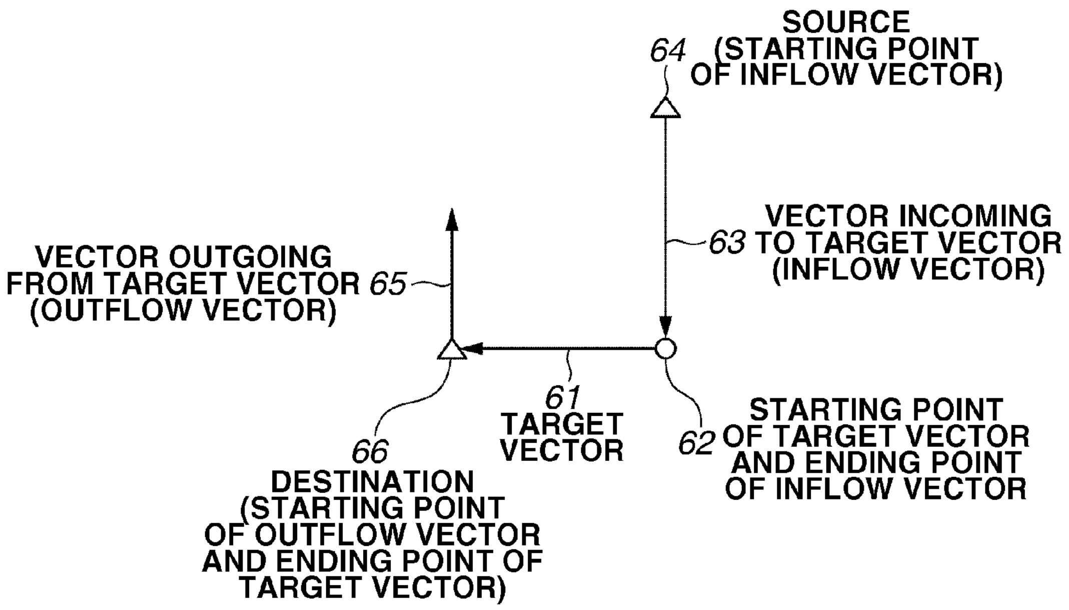
FIG. 6 illustrates relations between a target vector, an inflow vector, and an outflow vector.

When information about an extracted starting point of a vertical vector and an extracted starting point of a horizontal vector is recorded, connection information related to information about a starting point of a vector incoming to a target vector and a starting point of a vector outgoing from the target vector is added. Hereinafter, a starting point of a vector incoming to a target vector is simply referred to as a source, a starting point of a vector outgoing from the target vector is simply referred to as a destination, the vector incoming to the target vector is referred to as an inflow vector, and the vector outgoing from the target vector is referred to as an outflow vector. A starting point of the target vector is also an ending point of the inflow vector, and a starting point of the outflow vector is also an ending point of the target vector. An example of a relation between the three vectors is illustrated in FIG. 6. FIG. 6 illustrate a target vector 61 which is a horizontal vector, an inflow vector 63, and an outflow vector 65. A point 62 is a starting point of the target vector 61 and also an ending point of the inflow vector 63. A point 64 is a starting point (source) of the inflow vector 63. A point 66 is a starting point (destination) of the outflow vector 65 and also an ending point of the target vector 61. A starting point of a vertical vector is denoted by a white triangular mark. A starting point of a horizontal vector is denoted by a white round mark.

Figures 7A, 7B:
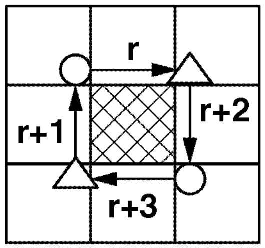
FIGS. 7A and 7B illustrate information recorded in a vector information table for a label composed of only one point.

These vectors are recorded in one vector information table for each label. For example, FIGS. 7A and 7B illustrate information recorded in the above-described vector information table when a target label is composed of only one point (pixel). FIG. 7A illustrates a 3×3 labeled image composed of a center pixel (one point) and eight pixels surrounding the center pixel. Each of the eight surrounding pixels is allocated a different label from the center pixel. The label of the center pixel is surrounded by four different linear elements: a horizontal vector R, a vertical vector (r+2), a horizontal vector (r+3), and a vertical vector (r+1). FIG. 7B illustrates a vector information table in which these four vectors are recorded. Referring to the vector information table illustrated in FIG. 7B, each row represents one vector, i.e., one linear element. The "VECTOR COUNTER" column indicates a vector number which is incremented in order of extraction. (The vector counter is also referred to as a vector index or table index.) The vector number is basically allocated in ascending order of extraction as a contour point or a color intersection point. In the descriptions referring to FIG. 7A, each of vector numbers r, r+1, r+2, and r+3 allocated in order of extraction is also used as a vector name for identifying each vector. Although r is used as an initial value of the vector number for convenience of description, vector numbers 0, 1, 2, and 3 are used, respectively, assuming that the initial value is 0. The "STARTING POINT" column includes the "X COORDINATE" and "Y COORDINATE" columns which respectively store X and Y coordinate values of the starting point of each vector. Referring to FIG. 7B, coordinate values of a starting point of each vector are described assuming that coordinate values of the center pixel are (2i, 2j). The "INFLOW VECTOR" column stores a vector number of an inflow vector of each vector having the relevant vector number. Likewise, the "OUTFLOW VECTOR" column stores a vector number of an outflow vector of each vector having the relevant vector number. The "COLOR INTERSECTION POINT FLAG" column is a flag area for storing "TRUE" when each vector having the relevant vector number is a color intersection point or "FALSE" otherwise. The "UNUSED FLAG" column is a flag area referred to in contour information reconstruction processing in step S1300, and will be additionally described below.

Figure 8:
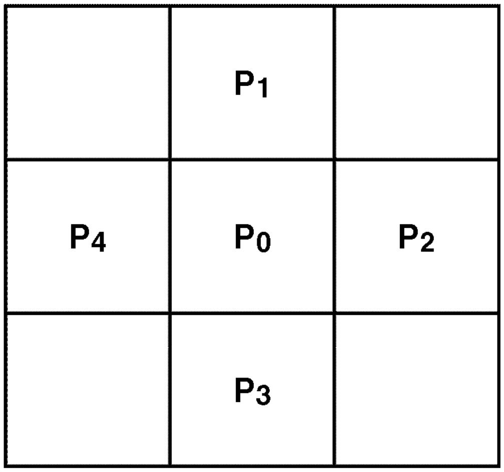
FIG. 8 illustrates a 3×3 pixel matrix composed of a center pixel and four neighboring pixels (pixels adjacently existing) to the left, right, upside, and downside of the center pixel.

Processing with a 3×3-pixel window will be described below with reference to FIG. 8. Focusing on a target pixel (a center pixel of the 3×3-pixel window) and four neighboring pixels to the left, right, upside, and downside of the target pixel, the processing extracts a starting point of a contour vector and a color intersection point around the target pixel, and obtains a local connection relation between them. First of all, when a target pixel P0 is a pixel of the label region subjected to contour extraction, the CPU 7 sets R0 to 1 (R0=1), and compares the target pixel P0 with each of the four neighboring pixels P1, P2, P3, and P4 illustrated in FIG. 8. When an affiliation label of the target pixel coincides with that of a neighboring pixel, the CPU 7 sets a value Rk of a position Pk (k=1, 2, 3, 4) of the matched pixel to 1 (Rk=1). Otherwise, the CPU 7 sets the value Rk of the position Pk of the unmatched pixel to 0 (Rk=0). Then, the CPU 7 obtains a value R by using the following formula in which R0, R1, R2, and R3 are multiplied by respective coefficients.

R=R0+1×R1+2×R2+4×R3+8×R4 When the target pixel P0 is not a pixel of the label region subjected to contour extraction, the CPU 7 sets R to 0 (R=0) regardless of the states of the four neighboring pixels.

The value R has a value from 0 to 16 depending on the states of the affiliation labels of the target pixel and the four neighboring pixels to the left, right, upside, and downside of the target pixel. Accordingly, cases of the values 0 to 16 are referred to as cases 0 to 16, respectively. The CPU 7 executes predetermined color intersection point determination and contour point extraction processing according to each case. In case 0, the CPU 7 does not execute the color intersection point determination and contour point extraction processing.

Figure 9A:
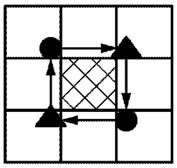
FIGS. 9A, 9B, 9C, 9D, 9E, 9F, 9G, 9H, 9I, 9J, 9K, 9L, 9M, 9N, 9O, and 9P illustrate color intersection point determination and contour point extraction processing in 16 different cases (cases 1 to 16).
Figure 9B:
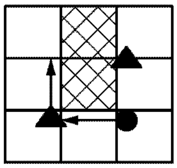
Figure 9C:
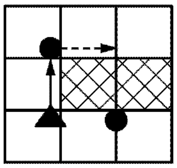
Figure 9D:
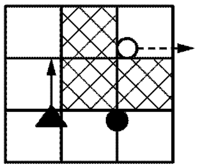
Figure 9E:
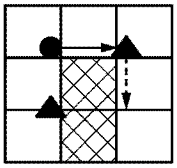
Figure 9F:
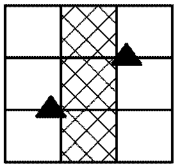
Figure 9G:
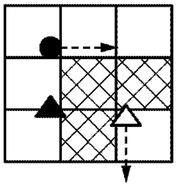
Figure 9H:
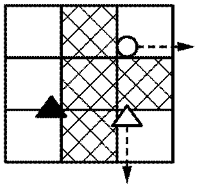
Figure 9I:
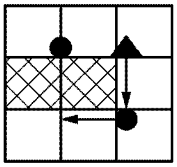
Figure 9J:
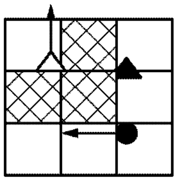
Figure 9K:
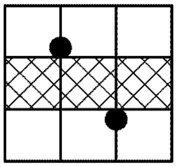
Figure 9L:
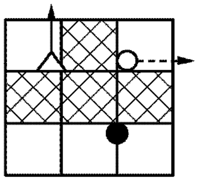
Figure 9M:
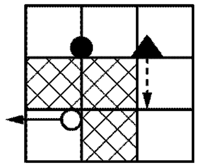
Figure 9N:
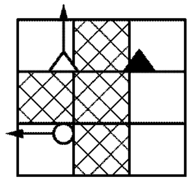
Figure 9O:
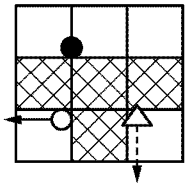
Figure 9P:
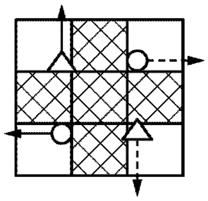

The color intersection point determination and contour point extraction processing in cases 1 to 16 is illustrated in FIGS. 9A to 9P, respectively. FIGS. 9A to 9P illustrate whether each of the four pixels to the left, right, upside, and downside of the center pixel is allocated an identical label to the center pixel. When any of the four neighboring pixels is allocated an identical label to the center pixel, the relevant pixel is shaded with the same shading pattern as the center pixel. Otherwise, the relevant pixel is left unshaded. Referring to each of FIGS. 9A to 9P, pixels adjacently existing at the four diagonal positions (to the upper left, lower left, upper right, and lower right positions) of the center pixel are not relevant to the above-described classification into cases 1 to 16, and, therefore, these pixels are left unshaded regardless of the label. FIGS. 9A to 9P illustrate the states of 16 different 3×3-pixel windows and processing applied thereto in cases 1 to 16, respectively. In FIGS. 9A to 9P, a white round mark is a contour point candidate position at which processing for extracting a starting point of a horizontal vector (not a color intersection point) is performed, not accompanied by determination whether the starting point is a color intersection point (hereinafter referred to as color intersection point determination). A white triangular mark is a contour point candidate position at which processing for extracting a starting point of a vertical vector (not a color intersection point) is performed, not accompanied by the color intersection point determination. A black round mark with a horizontal arrow is a contour point candidate position at which processing for extracting a starting point of a horizontal vector is performed, accompanied by the color intersection point determination. A black triangular mark with a vertical arrow is a contour point candidate position at which processing for extracting a starting point of a vertical vector is performed, accompanied by the color intersection point determination. A black round mark without an arrow is a candidate position at which the color intersection point determination is made and, when the starting point is determined to be a color intersection point, processing for extracting a starting point of a horizontal vector (a color intersection point) is performed. A black triangular mark without an arrow is a candidate position at which the color intersection point determination is made and, when the starting point is determined to be a color intersection point, processing for extracting a starting point of a vertical vector (a color intersection point) is performed. A solid line arrow means that, when a vector is extracted at the position of this arrow, an extracted vector outgoing from this position exists. A broken line arrow means that, when a vector is extracted at the position of this arrow, a vector which should be outgoing from this position has not yet been extracted, i.e., a vector to be extracted with a destination undetermined. Hereinafter, extracting a starting point of a horizontal or vertical vector is simply referred to as extracting a vector.

Figure 10A:
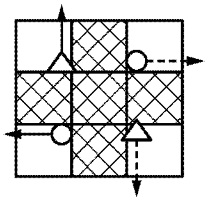
FIGS. 10A, 10B, 10C, 10D, 10E, 10F, 10G, 10H, 10I, 10J, 10K, 10L, and 10M illustrate contour point extraction not accompanied by color intersection point determination.

Contour point extraction not accompanied by the color intersection point determination will be described below with reference to FIGS. 10A to 10M. FIGS. 10A to 10M illustrate processing in the case 16, in which the label of the center pixel and the labels of the four pixels to the left, right, upside, and downside of the center pixel are all in an identical state. FIG. 10A illustrates again the pattern in the case 16 illustrated in FIG. 9P, for reference in FIGS. 10A to 10M.

Figure 10B:
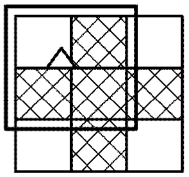
Figure 10C:
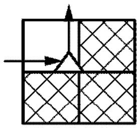
Figure 10D:
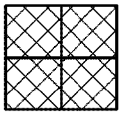

First of all, as illustrated in FIG. 10B, the CPU 7 determines whether a starting point of a vertical vector exists at the upper left position of the center pixel (assumed to have coordinate values (2i, 2j)). Specifically, the CPU 7 determines whether the pixel to the upper left of the center pixel (having coordinate values (2i−2, 2j−2)) is allocated an identical label to the center pixel. When the two pixels are allocated a different label from each other, the CPU 7 extracts a vertical vector at the upper left position of the center pixel (having coordinate values (2i−1, 2j−1)), as illustrated in FIG. 10C. When the two labels are identical, the CPU 7 does not extract a vector at the relevant position, as illustrated in FIG. 10D.

Figure 10E:
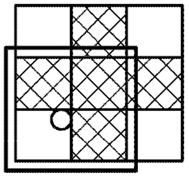
Figure 10F:
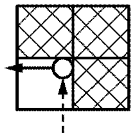
Figure 10G:
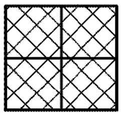

Then, as illustrated in FIG. 10E, the CPU 7 determines whether a starting point of a horizontal vector exists at the lower left position of the center pixel. Specifically, the CPU 7 determines whether the pixel to the lower left of the center pixel (having coordinate values (2i−2, 2j+2)) is allocated an identical label to the center pixel. When the two pixels are allocated a different label from each other, the CPU 7 extracts a horizontal vector at the lower left position of the center pixel (having coordinate values (2i−1, 2j+1)), as illustrated in FIG. 10F. When the two labels are identical, the CPU 7 does not extract a vector at the relevant position, as illustrated in FIG. 10G.

Figure 10H:
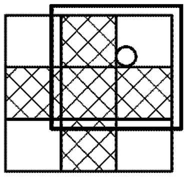
Figure 10I:
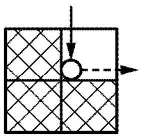
Figure 10J:
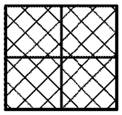

Then, as illustrated in FIG. 10H, the CPU 7 determines whether a starting point of a horizontal vector exists at the upper right position of the center pixel. Specifically, the CPU 7 determines whether the pixel to the upper right of the center pixel (having coordinate values (2i+2, 2j−2)) is allocated an identical label to the center pixel. When the two pixels are allocated a different label from each other, the CPU 7 extracts a horizontal vector at the upper right position of the center pixel (having coordinate values (2i+1, 2j−1)), as illustrated in FIG. 10I. When the two labels are identical, the CPU 7 does not extract a vector at the relevant position, as illustrated in FIG. 10J.

Figure 10K:
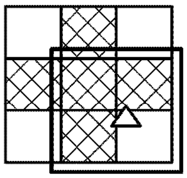
Figure 10L:
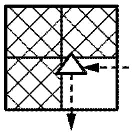
Figure 10M:
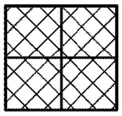

As illustrated in FIG. 10K, the CPU 7 determines whether a starting point of a vertical vector exists at the lower right position of the center pixel. Specifically, the CPU 7 determines whether the pixel to the lower right of the center pixel (having coordinate values (2i+2, 2j+2)) is allocated an identical label to the center pixel. When the two pixels are allocated a different label from each other, the CPU 7 extracts a vertical vector at the lower right position of the center pixel (having coordinate values (2i+1, 2j+1)), as illustrated in FIG. 10L. When the two labels are identical, the CPU 7 does not extract a vector at the relevant position, as illustrated in FIG. 10M.

Detailed processing and contour point extraction not accompanied by the color intersection point determination in the case 16 have specifically been described above with reference to FIGS. 10A to 10M.

Data handling on the vector information table when a vector is extracted will be additionally described below. In the vector information table (having the format described above with reference to FIG. 7B) for a target label region (a label region to which the center pixel belongs), the CPU 7 adds vector information to a table area corresponding to the row next to the vector information already found till then.

First of all, the CPU 7 stores in the "VECTOR COUNTER" column for the relevant row a vector number corresponding to the order of extraction.

Then, the CPU 7 stores X and Y coordinate values of the extracted vector respectively in the "X COORDINATE" and "Y COORDINATE" columns in the "STARTING POINT" column.

The "INFLOW VECTOR" and "OUTFLOW VECTOR" columns are handled in different ways in two different cases. In one case, the source and destination of an extracted vector exist in the direction of a region which has not yet been scanned (hereinafter also referred to as an unscanned region), as illustrated in FIG. 10L. In the other case, the source and destination of an extracted vector exist in the direction of a region which has already been scanned (hereinafter also referred to as a scanned region), as illustrated in FIG. 10C. When the source and destination exist in the direction of an unscanned region, the CPU 7 executes processing by separately using a table for managing information about vectors with an undetermined inflow vector, and a table for managing information about vectors with an undetermined outflow vector, in addition to the above-described vector information table. The table for managing vertical vectors with an undetermined inflow vector is referred to as an inflow-vector-undetermined vertical vector table. The table for managing vertical vectors with an undetermined outflow vector is referred to as an outflow-vector-undetermined vertical vector table. Likewise, for horizontal vectors, the CPU 7 uses an inflow-vector-undetermined horizontal vector table and an outflow-vector-undetermined horizontal vector table. The CPU 7 stores relevant vector numbers in order of detection in respective tables. In the case illustrated in FIG. 10L, the CPU 7 does not record anything in the "INFLOW VECTOR" column of the vector information table, and adds to the inflow-vector-undetermined vertical vector table the vector number on the vector information table to update the inflow-vector-undetermined vertical vector table. Likewise, the CPU 7 does not record anything in the "OUTFLOW VECTOR" column of the vector information table at this timing, and adds to the outflow-vector-undetermined vertical vector table the vector number on the vector information table to update the outflow-vector-undetermined vertical vector table. In the case illustrated in FIG. 10I where a horizontal vector is extracted, the CPU 7 does not record anything in the "OUTFLOW VECTOR" column at this timing, and adds the vector number to the outflow-vector-undetermined horizontal vector table to update the relevant table. In the case illustrated in FIG. 10F where a horizontal vector is extracted, the CPU 7 does not record anything in the "INFLOW VECTOR" column at this timing, and adds the vector number to the inflow-vector-undetermined horizontal vector table to update the relevant table.

On the other hand, similar to the vertical vector illustrated in FIG. 10C, when the source and destination exist in the direction of the scanned region, the CPU 7 determines the source and destination referring to the above-described table for managing information about vectors with an undetermined inflow vector, and the table for managing information about vectors with an undetermined outflow vector.

When a source of a vertical vector exists in the direction of the scanned region, the source is a horizontal vector with an undetermined destination. Therefore, when determining a source of such a vertical vector, the CPU 7 refers to the outflow-vector-undetermined horizontal vector table. Out of vectors having vector numbers stored in this table, the CPU 7 searches for, in the vector information table for the relevant label, a vector having the same Y coordinate value as the starting point of the relevant vertical vector. The CPU 7 stores an vector number of an obtained horizontal vector in the "INFLOW VECTOR" column for the relevant vertical vector in the vector information table, and stores the vector number of the relevant vertical vector in the "OUTFLOW VECTOR" column for the horizontal vector which has been undetermined till then. The CPU 7 deletes the vector number of the horizontal vector from the outflow-vector-undetermined horizontal vector table to update the relevant table.

The following describes a case where a destination of a vertical vector is determined when the destination exists in the direction of the scanned region, similar to the relevant vertical vector. When a destination of a vertical vector exists in the direction of the scanned region, the destination is a horizontal vector with an undetermined source, or a vertical vector with an undetermined source out of vertical vectors extracted at a color intersection point position (described below). Therefore, when defining a destination of such a vertical vector, the CPU 7 refers to both the inflow-vector-undetermined horizontal vector table and the inflow-vector-undetermined vertical vector table. Out of vectors having vector numbers stored in these tables, the CPU 7 searches for, in the vector information table for the relevant label, a vector having the same X coordinate value as the starting point of the relevant vertical vector. When more than one vector is found, the CPU 7 selects a vector having the largest Y coordinate value out of vectors having a smaller Y coordinate value than that of the relevant vertical vector (i.e., a closest contour point with an undetermined source in the scanned region). The CPU 7 stores the vector number of the obtained horizontal or vertical vector in the “OUTFLOW VECTOR” column for the relevant vertical vector in the vector information table, and stores the vector number of the relevant vertical vector in the “INFLOW VECTOR” column for the vector which has been undetermined till then. Further, the CPU 7 deletes the vector number of the vector from the inflow-vector-undetermined horizontal vector table or the inflow-vector-undetermined vertical vector table, in which the vector number of the acquired vector has been described, to update the relevant table.

Similar to the horizontal vector illustrated in FIG. 10I, when a source of a horizontal vector exists in the direction of the scanned region, the source is a vertical vector with an undetermined destination. Therefore, when determining a source of such a horizontal vector, the CPU 7 refers to the outflow-vector-undetermined vertical vector table. Out of vectors having vector numbers stored in this table, the CPU 7 searches for, in the vector information table for the relevant label, a vector having the same X coordinate value as the starting point of the relevant horizontal vector. The CPU 7 stores the vector number of the obtained vertical vector in the “INFLOW VECTOR” column for the horizontal vector of the vector information table, and stores the vector number of the relevant horizontal vector in the “OUTFLOW VECTOR” column for the vertical vector which has been undetermined till then. Further, the CPU 7 deletes the vector number of the vertical vector from the outflow-vector-undetermined vertical vector table to update the relevant table.

The following describes a case where a destination of a horizontal vector is determined when the destination exists in the direction of the scanned region, similar to the horizontal vector illustrated in FIG. 10F. When a destination of a horizontal vector exists in the direction of the scanned region, the destination is a vertical vector with an undetermined source, or a horizontal vector with an undetermined source out of horizontal vectors extracted at a color intersection point position (described below). Therefore, when defining a destination of such a horizontal vector, the CPU 7 refers to both the inflow-vector-undetermined horizontal vector table and the inflow-vector-undetermined vertical vector table. Out of vectors having vector numbers stored in these tables, the CPU 7 searches for, in the vector information table for the relevant label, a vector having the same Y coordinate value as the starting point of the relevant horizontal vector. When more than one vector is found, the CPU 7 selects a vector having the largest X coordinate value out of vectors having a smaller X coordinate value than that of the relevant horizontal vector (i.e., a closest contour point with an undetermined source in the scanned region). The CPU 7 stores the vector number of the obtained horizontal or vertical vector in the “OUTFLOW VECTOR” column for the relevant horizontal vector in the vector information table, and stores the vector number of the relevant horizontal vector in the “INFLOW VECTOR” column for the vector which has been undetermined till then. Further, the CPU 7 deletes the vector number of the vector from the inflow-vector-undetermined horizontal vector table or the inflow-vector-undetermined vertical vector table, in which the vector number of the acquired vector has been described, to update the relevant table.

In the “COLOR INTERSECTION POINT FLAG” column, the CPU 7 records “TRUE” when the vector currently being added is a color intersection point or “FALSE” otherwise. In the case 16, primarily, a contour point determined to be a color intersection point is not generated, and hence the color intersection point determination is not required. Thus, since contour points extracted in the cases illustrated in FIGS. 10C, FIG. 10F, FIG. 10I, and FIG. 10L are not a color intersection point, the CPU 7 records “FALSE” in the “COLOR INTERSECTION POINT FLAG” column in the relevant cases.

In step S1200, the CPU 7 records “TRUE” in the “UNUSED FLAG” column. The “UNUSED FLAG” column is a flag area referred to in the contour information reconstruction processing in step S1300, and will be additionally described below.

The contour point extraction and color intersection point determination accompanied by the color intersection point determination will be described below with reference to FIGS. 11A to 11U and FIGS. 12A to 12X.

Figure 11A:
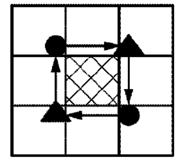
FIGS. 11A, 11B, 11C, 11D, 11E, 11F, 11G, 11H, 11I, 11J, 11K, 11L, 11M, 11N, 11O, 11P, 11Q, 11R, 11S, 11T, and 11U illustrate contour point extraction accompanied by color intersection point determination.
Figure 11B:
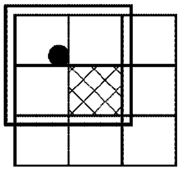
Figure 11C:
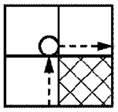
Figure 11D:
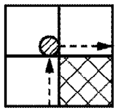
Figure 11E:
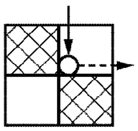
Figure 11F:
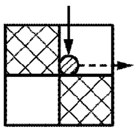
Figure 11G:
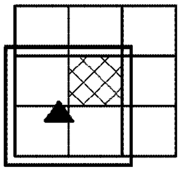
Figure 11H:
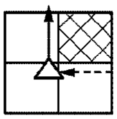
Figure 11I:
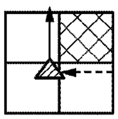
Figure 11J:
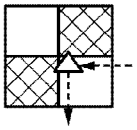
Figure 11K:
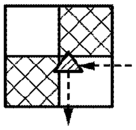
Figure 11L:
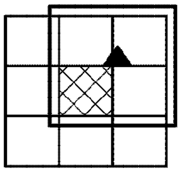
Figure 11M:
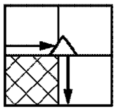
Figure 11N:
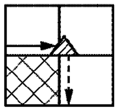
Figure 11O:
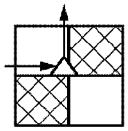
Figure 11P:
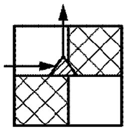
Figure 11Q:
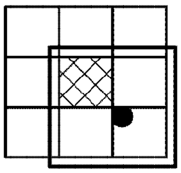
Figure 11R:
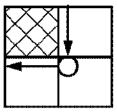
Figure 11S:
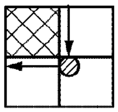
Figure 11T:
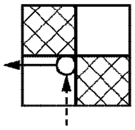
Figure 11U:
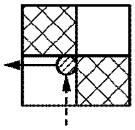

FIGS. 11A to 11U illustrate detailed processing in the case 1 where the label of the center pixel and the labels of the four pixels to the left, right, upside, and downside of the center pixel are all in different states. FIG. 11A illustrates again the pattern in the case 1 illustrated in FIG. 9A, for reference in FIGS. 11A to 11U.

First of all, as illustrated in FIG. 11B, the CPU 7 extracts a starting point of a horizontal vector at the upper left position (having coordinate values (2i−1, 2j−1)) of the center pixel (assumed to have coordinate values (2i, 2j)). With this horizontal vector, a destination is undetermined since the pixel to the upside of the center pixel is allocated a different label from the center pixel. Whether a source is determined or not depends on the state of the label of each pixel of a 2×2 region composed of four pixels including the center pixel and the pixels to the upper left, upside, and left of the center pixel. Further, whether a starting point of a horizontal vector at the upper left position of the center pixel is a color intersection point depends on the state of the label of each pixel of the 2×2 region composed of four pixels including the center pixel and the pixels to the upper left, upside, and left of the center pixel. Each of FIGS. 11C and 11D illustrates a case where the center pixel and the pixel to the upper left of the center pixel are allocated a different label from each other. In these cases, since an inflow vector of the relevant horizontal vector is also in the unscanned region, the relevant horizontal vector has an undetermined inflow vector and an undetermined outflow vector. Each of FIGS. 11E and 11F illustrates a case where the center pixel and the pixel to the upper left of the center pixel are allocated an identical label. In these cases, since an inflow vector of the relevant horizontal vector exists in the scanned region, the relevant horizontal vector has a determined inflow vector and an undetermined outflow vector. Even if the relevant horizontal vector has an undetermined inflow vector and an undetermined outflow vector, the starting point may or may not be a color intersection point. The relevant cases are illustrated in FIGS. 11C and 11D. FIG. 11C illustrates a case where the starting point of the relevant horizontal vector is not a color intersection point, and is denoted by a white round mark. FIG. 11D illustrates a case where the starting point of the relevant horizontal vector is a color intersection point, and is denoted by a round mark shaded with oblique lines (hereinafter simply referred to as a shaded round mark). Likewise, when the relevant horizontal vector has a determined inflow vector and an undetermined outflow vector, the starting point may or may not be a color intersection point. The relevant cases are illustrated in FIGS. 11E and 11F. FIG. 11E illustrates a case where the starting point of the relevant horizontal vector is not a color intersection point, and is denoted by a white round mark. FIG. 11F illustrates a case where the starting point of the relevant horizontal vector is a color intersection point, and is denoted by a shaded round mark.

Figures 12A, 12B, 12C, 12D, 12E, 12F, 12G, 12H, 12I, 12J, 12K, 12L, 12M, 12N, 12O, 12P, 12Q, 12R, 12S, 12T, 12U, 12V, 12W, 12X:
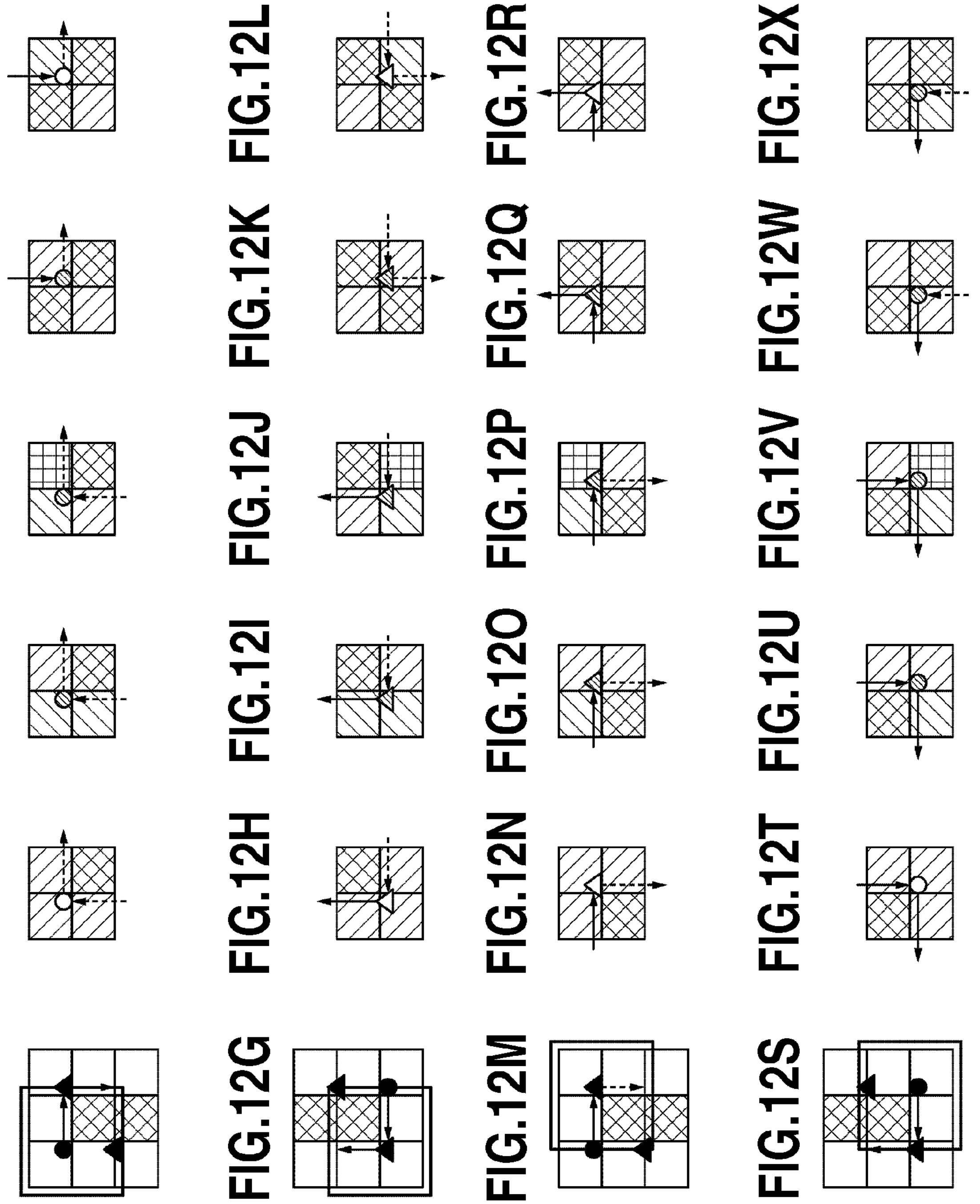
FIGS. 12A, 12B, 12C, 12D, 12E, and 12F, 12G, 12H, 12I, 12J, 12K, 12L, 12M, 12N, 12O, 12P, 12Q, 12R, 12S, 12T, 12U, 12V, 12W, and 12X illustrate color intersection point determination at the time of contour point extraction accompanied by color intersection point determination.

Color intersection point determination for a starting point of a horizontal vector at this position (the upper left position of the center pixel) will be described below with reference to FIGS. 12A to 12F. FIG. 12A illustrates the state of the case 5 illustrated in FIG. 9E. However, in the sense of color intersection point determination for a starting point of a horizontal vector at the upper left position of the center pixel, the CPU 7 executes similar processing to the processing for the relevant position in the case 1 illustrated in FIG. 11B. As illustrated in FIG. 12A, the CPU 7 executes the color intersection point determination based on the state of the label of each pixel of the 2×2 region composed of four pixels including the center pixel and the pixels to the upper left, the upside, and the left of the center pixel. Each of FIGS. 12B to 12D illustrates a case where the center pixel and the pixel to the upper left of the center pixel are allocated a different label from each other. In these cases, the CPU 7 also checks the two remaining pixels (the pixels to the upside and left of the center pixel) of the 2×2 region.

When the three pixels other than the center pixel are allocated an identical label (see FIG. 12B), the CPU 7 recognizes that two different color regions contact at the starting point position and hence determines that the starting point is a contour point which is not a color intersection point.

When the pixels to the upside and left of the center pixel are allocated an identical label, and the pixel to the upper left of the center pixel is allocated a different label from these pixels (not illustrated), the pixels to the upside and left of the center pixel are in the 8-pixel connection state, and the center pixel and the pixel to the upper left of the center pixel are in the non-connection state. In this case, the CPU 7 recognizes that only two different color regions contact at the starting point position of the relevant horizontal vector and hence determines that the starting point is a contour point which is not a color intersection point.

As illustrated in FIG. 12C, when the pixels to the upper left and left of the center pixel are allocated an identical label, and the one remaining pixel (the pixel to the upside of the center pixel) is allocated a different label from the center pixel and from other two pixels, the CPU 7 recognizes that three different color regions contact at the starting point position and hence determines that the starting point is a contour point which is a color intersection point.

When the pixels to the upper left and upside of the center pixel are allocated an identical label, and the one remaining pixel (the pixel to the left of the center pixel) is allocated a different label from the center pixel and from other two pixels, the CPU 7 recognizes that three different color regions contact at the starting point position and hence determines that the starting point is a contour point which is a color intersection point. Specifically, when vertically or horizontally connected two pixels out of the three pixels other than the center pixel are allocated an identical label, and the one remaining pixel is allocated a different label from the center pixel and from other two pixels, the CPU 7 determines that the starting point is a contour point which is a color intersection point.

As illustrated in FIG. 12D, when the three pixels other than the center pixel are allocated a different label from one another, the CPU recognizes that four different color regions contact at the starting point position and hence determines that the starting point is a color intersection point.

Each FIGS. 12E and 12F illustrates a case where the center pixel and the pixel to the upper left of the center pixel are allocated an identical label, i.e., a case where, out of 4 (2×2)-pixel regions in a 9 (3×3)-pixel region, the center pixel and the pixel adjacently existing at the diagonal position are allocated an identical label. When the two remaining pixels are allocated a different label from the center pixel and allocated an identical label (see FIG. 12E), either set of diagonal pixels is in the 8-pixel connection state. In this case, the CPU 7 determines that the starting point is a color intersection point in the sense that either connection state is handled in an equivalent way. When the two remaining pixels are allocated a different label from each other, as illustrated in FIG. 12F, similar to the above-described case (not illustrated), the center pixel and the pixel to the upper left are in the 8-pixel connection state, and the pixels to the top and left of the center pixel are in the non-connection state. The CPU 7 recognizes that only two different color regions contact at the starting point position of the relevant horizontal vector and hence determines that the starting point is a contour point which is not a color intersection point.

The contour point extraction and color intersection point determination accompanied by the color intersection point determination at the upper left position of the center pixel has specifically been described below with reference to FIGS. 11B to 11F and 12A to 12F. On the other hand, in the contour point extraction accompanied by the color intersection point determination and the color intersection point determination at the lower left position of the center pixel, the CPU 7 executes similar processing to the above-described processing although it is necessary to take into consideration that an extracted vector is a starting point of a vertical vector, and the starting point position is at the lower left position of the center pixel, including the handling of the source and destination. FIGS. 11G to 11K and FIGS. 12G to 12L illustrate the contour point extraction accompanied by the color intersection point determination and the color intersection point determination at the lower left position of the center pixel. The present exemplary embodiment is easily applicable to these cases including cases not illustrated, and detailed descriptions thereof will be omitted. Likewise, FIGS. 11L to 11P and FIGS. 12M to 12R illustrate the contour point extraction accompanied by the color intersection point determination and the color intersection point determination at the upper right position of the center pixel. It is necessary to take into consideration that an extracted vector is a starting point of a vertical vector, and the starting point position is at the upper right position of the center pixel. The present exemplary embodiment is easily applicable to these cases including cases not illustrated, and detailed descriptions thereof will be omitted. Likewise, FIGS. 11Q to 11U and FIGS. 12S to 12X illustrate the contour point extraction accompanied by the color intersection point determination and the color intersection point determination at the lower right position of the center pixel. It is necessary to take into consideration that an extracted vector is a starting point of a horizontal vector, and the starting point position is at the lower right position of the center pixel. The present exemplary embodiment is easily applicable to these cases including cases not illustrated, and detailed descriptions thereof will be omitted.

Processing at a position of a black round mark without an arrow and processing at a position of a black triangular mark without an arrow illustrated in FIGS. 9A to 9P will be described below with reference to FIGS. 13A to 13P. In the processing at a position of a black round mark without an arrow, the CPU 7 makes the color intersection point determination and, when the starting point is determined to be a color intersection point, performs processing for extracting a starting point of a horizontal vector which is a color intersection point. In the processing at a position of a black triangular mark without an arrow, the CPU 7 makes the color intersection point determination and, when the starting point is determined to be a color intersection point, performs processing for extracting a starting point of a vertical vector which is a color intersection point.

Figure 13A:
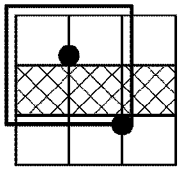
FIGS. 13A, 13B, 13C, 13D, 13E, 13F, 13G, 13H, 13I, 13J, 13K, 13L, 13M, 13N, 13O, and 13P illustrate color intersection point determination and contour point extraction only in the case of color intersection point.
Figure 13B:
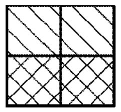
Figure 13C:
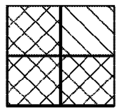
Figure 13D:
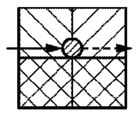
Figure 13E:
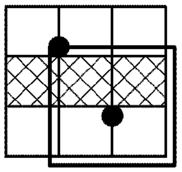

FIGS. 13A and 13E illustrate the processing in the case 11 (see FIG. 9K).

FIG. 13A illustrates processing occurring when the center pixel and the pixel to the left of the center pixel are allocated an identical label, and the pixel to the upside of the center pixel is allocated a different label from the center pixel. The CPU 7 determines whether the upper left position (having coordinate values (2i−1, 2j−1)) of the center pixel (assumed to have coordinate values (2i, 2j)) is a color intersection point and, only when the relevant position is determined to be a color intersection point, extracts a starting point of a horizontal vector. With a pixel pattern of a 4 (2×2)-pixel region centering on the pixel to the upper left of the center pixel, only when two pixels other than the center pixel and the pixel to the left of the center pixel are allocated a different label from each other, and the diagonal pixel to the upper left of the center pixel is allocated a different label from the center pixel, as illustrated in FIG. 13D, the CPU 7 extracts a starting point of a horizontal vector which is a color intersection point at the upper left position (having coordinate values (2i−1, 2j−1)) of the center pixel. With this horizontal vector, a source is determined since it exists in the scanned region, and a destination is undetermined since it exists in the unscanned region. FIG. 13B illustrates a case where the pixel adjacently existing at the diagonal position of the center pixel is allocated a different label from the center pixel, and allocated an identical label to the pixel to the upside of the center pixel. FIG. 13C illustrates a case where two pixels other than the center pixel and the pixel to the left of the center pixel are allocated a different label from each other, and the pixel adjacently existing at the diagonal position of the center pixel is allocated an identical label to the center pixel. In the cases of FIGS. 13B and 13C, the upper left position of the center pixel is not a color intersection point, and a contour point is not extracted from the relevant position.

Figure 13F:
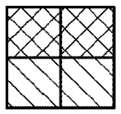
Figure 13G:
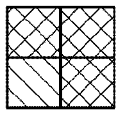
Figure 13H:
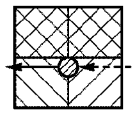

FIG. 13E illustrates processing occurring when the center pixel and the pixel to the right of the center pixel are allocated an identical label, and the pixel to the downside of the center pixel is allocated a different label from the center pixel. The CPU 7 determines whether the lower right position (having coordinate values (2i+1, 2j+1)) of the center pixel (assumed to have coordinate values (2i, 2j)) is a color intersection point and, only when the relevant position is determined to be a color intersection point, extracts a starting point of a horizontal vector. With a pixel pattern of a 4 (2×2)-pixel region centering on the pixel to the lower right of the center pixel, only when two pixels other than the center pixel and the pixel to the right of the center pixel are allocated a different label from each other, and the diagonal pixel to the lower right of the center pixel is allocated a different label from the center pixel, as illustrated in FIG. 13H, the CPU 7 extracts a starting point of a horizontal vector which is a color intersection point at the lower right position (having coordinate values (2i+1, 2j+1)) of the center pixel. With this horizontal vector, a source is undetermined since it exists in the unscanned region, and a destination is determined since it exists in the scanned region. FIG. 13F illustrates a case where the pixel adjacently existing at the diagonal position of the center pixel is allocated a different label from the center pixel, and allocated an identical label to the pixel to the downside of the center pixel. FIG. 13G illustrates a case where two pixels other than the center pixel and the pixel to the right of the center pixel are allocated a different label from each other, and the pixel adjacently exiting at the diagonal position of the center pixel is allocated an identical label to the center pixel. In the cases of FIGS. 13F and 13G, the lower right position of the center pixel is not a color intersection point, and a contour point is not extracted from the relevant position.

Figure 13I:
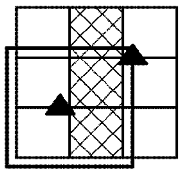
Figure 13J:
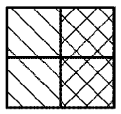
Figure 13K:
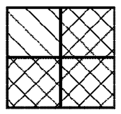
Figure 13L:
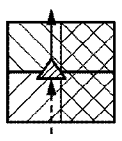
Figure 13M:
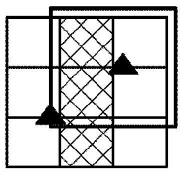

FIGS. 13I and 13M illustrate the processing in the case 6 (see FIG. 9F).

FIG. 13I illustrates processing occurring when the center pixel and the pixel to the downside of the center pixel are allocated an identical label, and the pixel to the left of the center pixel is allocated a different label from the center pixel. The CPU 7 determines whether the lower left position (having coordinate values (2i−1, 2j+1)) of the center pixel (assumed to have coordinate values (2i, 2j)) is a color intersection point and, only when the relevant position is determined to be a color intersection point, extracts a starting point of a vertical vector. With a pixel pattern of a 4 (2×2)-pixel region centering on the pixel to the lower left of the center pixel, only when two pixels other than the center pixel and the pixel to the downside of the center pixel are allocated a different label from each other, and the diagonal pixel to the lower left of the center pixel is allocated a different label from the center pixel, as illustrated in FIG. 13L, the CPU 7 extracts a starting point of a vertical vector which is a color intersection point at the lower left position (having coordinate values (2i−1, 2j+1)) of the center pixel. With this vertical vector, a source is undetermined since it exists in the unscanned region, and a destination is determined since it exists in the scanned region. FIG. 13J illustrates a case where the pixel adjacently existing at the diagonal position of the center pixel is allocated a different label from the center pixel, and allocated an identical label to the pixel to the left of the center pixel. FIG. 13K illustrates a case where two pixels other than the center pixel and the pixel to the downside of the center pixel are allocated a different label from each other, and the pixel adjacently exiting at the diagonal position of the center pixel is allocated an identical label to the center pixel. In the cases of FIGS. 13J and 13K, the lower left position of the center pixel is not a color intersection point, and a contour point is not extracted from the relevant position.

Figure 13N:
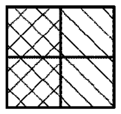
Figure 13O:
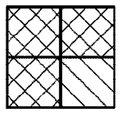
Figure 13P:
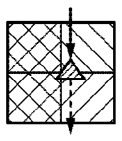

FIG. 13M illustrates processing occurring when the center pixel and the pixel to the upside of the center pixel are allocated an identical label, and the pixel to the right of the center pixel is allocated a different label from the center pixel. The CPU 7 determines whether the position (having coordinate values (2i+1, 2j−1)) at the upper right position of the center pixel (assumed to have coordinate values (2i, 2j)) is a color intersection point and, only when the relevant position is determined to be a color intersection point, extracts a starting point of a vertical vector. With a pixel pattern of a 4 (2×2)-pixel region centering on the pixel to the upper right of the center pixel, only when two pixels other than the center pixel and the pixel to the upside of the center pixel are allocated a different label from each other, and the diagonal pixel to the upper right of the center pixel is allocated a different label from the center pixel, as illustrated in FIG. 13P, the CPU 7 extracts a starting point of a vertical vector which is a color intersection point at the upper right position (having coordinate values (2i+1, 2j−1)) of the center pixel. With this vertical vector, a source is determined since it exists in the scanned region, and a destination is undetermined since it exists in the unscanned region. FIG. 13N illustrates a case where the pixel adjacently existing at the diagonal position of the center pixel is allocated a different label from the center pixel, and allocated an identical label to the pixel to the right of the center pixel. FIG. 13O illustrates a case where two pixels other than the center pixel and the pixel to the upside of the center pixel are allocated a different label from each other, and the pixel adjacently exiting at the diagonal position of the center pixel is allocated an identical label to the center pixel. In the cases of FIGS. 13N and 13O, the upper right position of the center pixel is not a color intersection point, and a contour point is not extracted from the relevant position.

As described above, in the "COLOR INTERSECTION POINT FLAG" column of the vector information table corresponding to the contour point determined to be a color intersection point, the CPU 7 records "TRUE" when the vector currently being added is a color intersection point or "FALSE" otherwise.

FIGS. 10A to 10M correspond to the processing in the case 16 illustrated in FIG. 9P. FIGS. 11A to 11U correspond to the processing in the case 1 illustrated in FIG. 9A. FIGS. 13A and 13E correspond to the processing in the case 11 illustrated in FIG. 9K. FIGS. 13I and 13M correspond to the processing in the case 6 illustrated in FIG. 9F. Other cases include combinations of the contour point extraction processing not accompanied by the color intersection point determination, the contour point extraction processing accompanied by the color intersection point determination, and the color intersection point determination and, only when a contour point is determined to be a color intersection point, the contour point extraction processing at the upper left, lower left, upper right, and lower right positions of the center pixel. For example, the case 2 illustrated in FIG. 9B includes the contour point extraction processing accompanied by the color intersection point determination at the lower left position of the center pixel, the color intersection point determination and, only when a contour point is determined to be a color intersection point, the contour point extraction processing at the upper right position of the center pixel, and the contour point extraction processing accompanied by the color intersection point determination at the lower right of the center pixel. The case 4 illustrated in FIG. 9D includes the contour point extraction processing accompanied by the color intersection point determination at the lower left of the center pixel, the contour point extraction processing not accompanied by the color intersection point determination at the upper right of the center pixel, and the color intersection point determination and, only when a contour point is determined to be a color intersection point, the contour point extraction processing at the lower right position of the center pixel. Other cases can be covered by performing similar processing, and detailed descriptions thereof will be omitted. The order of processing at the upper left, lower left, upper right, and lower right positions of the center pixel (processing may not be present for any position depending on the case) required for each case needs to be consistent with the handling of the unscanned region in order of raster scanning and of a source and a destination of an extracted contour point. Therefore, in the present exemplary embodiment, the CPU 7 executes processing at the upper left, lower left, upper right, and lower right positions of the center pixel in this order (if processing is not present for any position depending on the case, the relevant position is skipped).

The color intersection point determination and contour point extraction processing in step S1200 has specifically been described above. In step S1200, the vector information table, the inflow-vector-undetermined horizontal vector table, the inflow-vector-undetermined vertical vector table, the outflow-vector-undetermined horizontal vector table, and the outflow-vector-undetermined vertical vector table are allocated as areas (not illustrated) in the RAM 5. The processing in step S1200 implements a color intersection point determination and contour point extraction unit 103 illustrated in FIG. 1. In particular, the color intersection point determination described above with reference to FIGS. 12A to 12X and FIGS. 13A to 13P implements a color intersection point determination unit 1031 illustrated in FIG. 1, and the contour point extraction processing described above with reference to FIGS. 10A to 10M, FIGS. 11A to 11U, and FIGS. 13A to 13P implements a contour point extraction unit 1032 illustrated in FIG. 1.

The flow of the processing in step S1200 will be additionally described below with reference to FIGS. 14A to 14D and FIGS. 15A to 15F, based on concrete examples.

FIG. 15 illustrates the states of the above-described four different tables including the inflow-vector-undetermined horizontal vector table, the outflow-vector-undetermined horizontal vector table, the inflow-vector-undetermined vertical vector table, and the outflow-vector-undetermined vertical vector table. A sufficient area is assumed to be allocated for each table in the RAM 5. Areas for these tables are constructed as continuous memory areas. In each table, the CPU 7 stores a relevant undetermined vector number from the starting area in order of occurrence. In each area, "−1" is prestored at the position next to the last effective data item, as a marker indicating the end of data. To add a data item, the CPU 7 overwrites a new vector number at the position of this marker, and writes the marker at the position next to the new vector number. To delete a data item, the CPU 7 shifts to the position of the data item to be deleted the data items ranging from the effective data item next to the data item to be deleted to the marker.

Figures 14A, 14B, 14C, 14D:
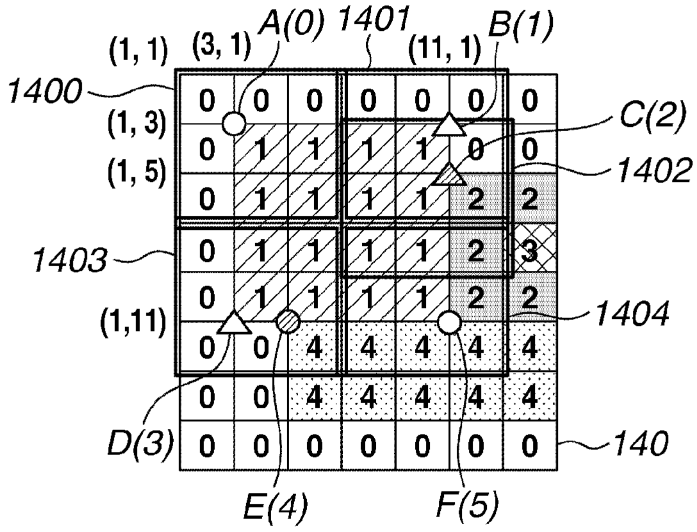
FIGS. 14A, 14B, 14C, and 14D illustrate a flow of processing in step S1200 based on a concrete example.

When the CPU 7 applies the processing in step S1200 to a labeled image 140 as illustrated in FIG. 14A, a vector information table as illustrated in FIG. 14B is obtained for a color region 1 (a region having the label number 1). Six points A(0), B(1), C(2), D(3), E(4), and F(5) illustrated in FIG. 14A respectively correspond to six vectors having vector numbers 0, 1, 2, 3, 4, and 5 (values in the "VECTOR COUNTER" column) illustrated in FIG. 14B. When the labeled image 140 illustrated in FIG. 14A is raster-scanned, contour points are extracted at the positions A(0), B(1), C(2), D(3), E(4), and F(5) in this order.

Figure 15A:
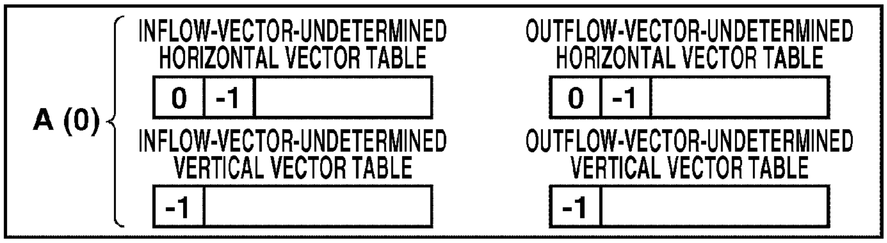
FIGS. 15A, 15B, 15C, 15D, 15E, and 15F illustrate states of four different tables including an inflow-vector-undetermined horizontal vector table, an outflow-vector-undetermined horizontal vector table, an inflow-vector-undetermined vertical vector table, and an outflow-vector-undetermined vertical vector table.

Specifically, after the CPU 7 starts raster scanning from the top left position of the labeled image 140, when the 3×3-pixel matrix window comes to a position 1400 illustrated in FIG. 14A, the state of the case 7 illustrated in FIG. 9G results. At this timing, the CPU 7 executes the contour point extraction processing accompanied by the intersection point determination at the upper left position of the center pixel, and the state illustrated in FIG. 12B results. Therefore, a contour point (a starting point of a horizontal vector) which is not a color intersection point is extracted as the vector number 0 at the position A(0) illustrated in FIG. 14A. Since this vector has an undetermined inflow vector and an undetermined outflow vector, the CPU 7 adds the vector number 0 to the inflow-vector-undetermined horizontal vector table and the outflow-vector-undetermined horizontal vector table, as illustrated in FIG. 15A.

Figure 15B:
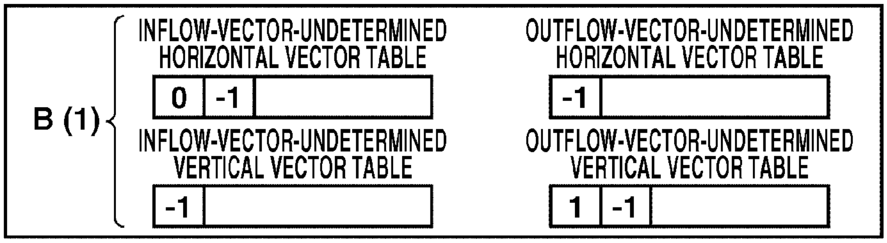

As the raster scanning progresses, when the 3×3-pixel matrix window comes to a position 1401 illustrated in FIG. 14A, the state of the case 13 illustrated in FIG. 9M results. At this timing, the CPU 7 executes the contour point extraction processing accompanied by the intersection point determination at the upper right position of the center pixel, and the state illustrated in FIG. 12N results. Accordingly, a contour point (a starting point of a vertical vector) which is not a color intersection point is extracted as the vector number 1 at the position B(1) illustrated in FIG. 14A. Since this vector has an undetermined outflow vector and an inflow vector existing in the scanned region, the CPU 7 makes a search in the outflow-vector-undetermined horizontal vector table, and determines that the vector number 0 is an inflow vector. Therefore, as described above, the CPU 7 stores information in the "INFLOW VECTOR" column for the vector number 1 and the "OUTFLOW VECTOR" column for the vector number 0 in the vector information table. As illustrated in FIG. 15B, the CPU 7 deletes the vector number 0 from the outflow-vector-undetermined horizontal vector table, and adds the vector number 1 to the outflow-vector-undetermined vertical vector table.

Figure 15C:
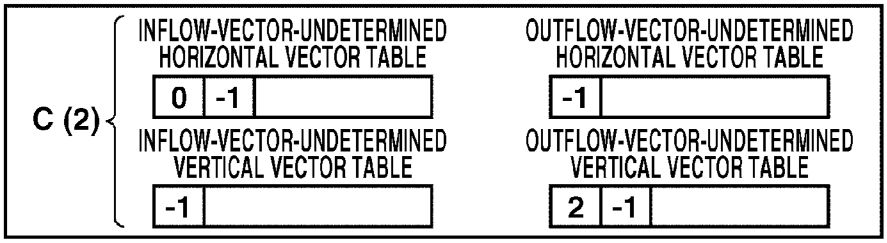

Subsequently, when the 3×3 pixel matrix window comes to a position 1402 illustrated in FIG. 14A, the state of the case 6 illustrated in FIG. 9F results. At this timing, the CPU 7 executes the contour point extraction processing based on the result of the intersection point determination at the upper right position of the center pixel, and the state illustrated in FIG. 13P results. Accordingly, a contour point (a starting point of a vertical vector) which is a color intersection point is extracted as the vector number 2 at the position C(2) illustrated in FIG. 14A. Since this vector has an undetermined outflow vector and an inflow vector existing in the scanned region, the CPU 7 makes a search in the outflow-vector-undetermined vertical vector table, and determines that the vector number 1 is an inflow vector. Therefore, as described above, the CPU 7 stores information in the "INFLOW VECTOR" column for the vector number 2 and the "OUTFLOW VECTOR" column for the vector number 1 in the vector information table. Then, as illustrated in FIG. 15C, the CPU deletes the vector number 1 from the outflow-vector-undetermined vertical vector table, and adds the vector number 2 to the vector information table.

Figure 15D:
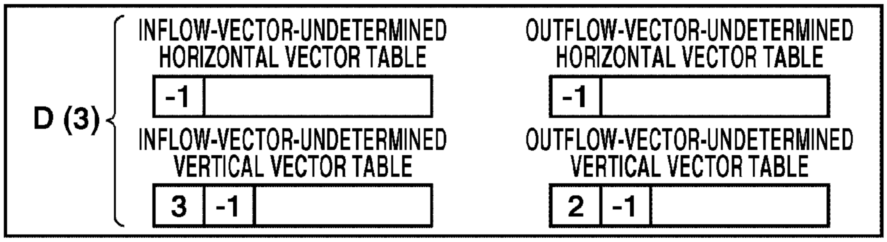
Figure 15E:
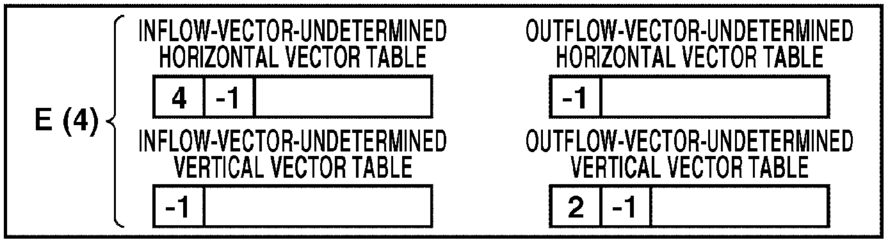

Subsequently, when the 3×3 pixel matrix window comes to a position 1403 illustrated in FIG. 14A, the state of the case 4 illustrated in FIG. 9D results. At this timing, the CPU 7 executes the contour point extraction processing accompanied by the intersection point determination at the lower left position of the center pixel, and the state illustrated in FIG. 12H results. Accordingly, a contour point (a starting point of a vertical vector) which is not a color intersection point is extracted as the vector number 3 at the position D(3) illustrated in FIG. 14A. Since this vector has an undetermined inflow vector and an outflow vector existing in the scanned region, the CPU 7 makes a search in both the inflow-vector-undetermined horizontal vector table and the inflow-vector-undetermined vertical vector table as described above, and determines that the vector number 0 is an outflow vector. Therefore, as described above, the CPU 7 stores information in the "OUTFLOW VECTOR" column for the vector number 3 and the "INFLOW VECTOR" column for the vector number 0 in the vector information table. As illustrated in FIG. 15D, the CPU 7 deletes the vector number 0 from the inflow-vector-undetermined horizontal vector table, and adds the vector number 3 to the inflow-vector-undetermined vertical vector table. Further, in the state of the case 4, the CPU 7 executes the contour point extraction processing based on the result of the intersection point determination at the lower right position of the center pixel, and the state illustrated in FIG. 13H results. Accordingly, a contour point (a starting point of a horizontal vector) which is a color intersection point is extracted as the vector number 4 at the position E(4) illustrated in FIG. 14A. Since this vector has an undetermined inflow vector and an outflow vector existing in the scanned region, the CPU 7 makes a search in both the inflow-vector-undetermined horizontal vector table and the inflow-vector-undetermined vertical vector table as described above, and determines that vector number 3 is an outflow vector. Therefore, as described above, the CPU 7 stores information in the "OUTFLOW VECTOR" column for the vector number 4 and the "INFLOW VECTOR" column for the vector number 3 in the vector information table. As illustrated in FIG. 15E, the CPU 7 deletes the vector number 3 from the inflow-vector-undetermined vertical vector table, and adds the vector number 4 to the inflow-vector-undetermined horizontal vector table.

Figure 15F:
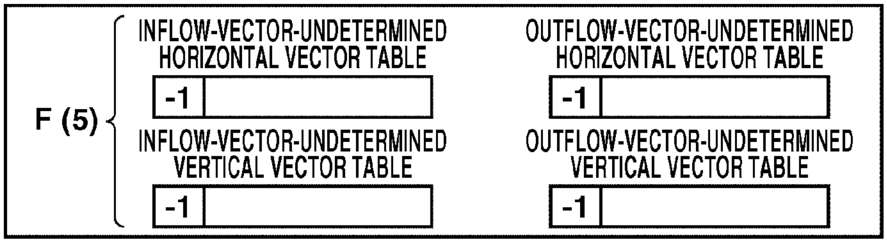

Subsequently, when the 3×3 pixel matrix window comes to a position 1404 illustrated in FIG. 14A, the state of the case 10 illustrated in FIG. 9J results. At this timing, the CPU 7 executes the contour point extraction processing accompanied by the intersection point determination at the lower right position of the center pixel. As illustrated in FIG. 12U, two vertically or horizontally connected pixels out of the three pixels other than the center pixel are allocated an identical label, and the one remaining pixel is allocated a different label from the center pixel and from the other two pixels. Therefore, the CPU 7 determines that the starting point is a contour point which is a color intersection point. Accordingly, a contour point (a starting point of the horizontal vector) which is a color intersection point is extracted as the vector number 5 at the position F(5) illustrated in FIG. 14A. This vector has an inflow vector and an inflow vector both existing in the scanned region. The CPU 7 makes a search in the outflow-vector-undetermined vertical vector table, and determines that the vector number 2 is an inflow vector. Therefore, as described above, the CPU 7 stores information in the "INFLOW VECTOR" column for the vector number 5 and the "OUTFLOW VECTOR" column for the vector number 2 in the vector information table. As illustrated in FIG. 15F, the CPU 7 deletes the vector number 2 from the outflow-vector-undetermined vertical vector table. Then, the CPU 7 makes a search in both the inflow-vector-undetermined horizontal vector table and the inflow-vector-undetermined vertical vector table, and determines that the vector number 4 is an outflow vector. As illustrated in FIG. 15F, the CPU 7 deletes the vector number 4 from the inflow-vector-undetermined horizontal vector table.

As a result, a vector information table as illustrated in FIG. 14B is obtained for the color region 1 (a region having the label number 1) in the labeled image 140 as illustrated in FIG. 14A.

The above-described contour point and the color intersection point extraction processing in step S1200 enables sequentially extracting vector information for each label of a labeled image. With this method, to process all of label regions in the labeled image, the CPU 7 repetitively raster-scan the labeled image the number of times corresponding to the number of labels to repeat the above-described processing. In this case, preacquiring a range in which each label region exists as a rectangular region in the labeled image, and limiting the range of raster scanning to each rectangular region (a partial region in the labeled image) for each label enable reducing the processing time.

Meanwhile, contour vector information for all of labels appearing in the labeled image can also be extracted by raster-scanning the labeled image once. In this case, for all of labels appearing in the labeled image, vector information tables and tables for managing information about vectors having an undetermined inflow or outflow vector are separately prepared for respective label regions. The CPU 7 performs raster scanning processing while successively selecting one of these tables to which the relevant center pixel belongs. Although this method requires more memory space sufficient for the number of labels than required in the above-described case of repeating scanning, the method, by raster-scanning the labeled image once, enables extracting contour vector data for respective label regions to respective independent vector information tables for all of labels.

In step S1300, based on the vector information in the vector information tables extracted in step S1200, the CPU 7 reconstructs color regions (label regions) into contour information expressed as a set of partial contours each being sectioned by color intersection points.

Referring to the "UNUSED FLAG" column in the vector information table in ascending order of the vector number, the CPU 7 searches for an unprocessed vector (the "UNUSED FLAG" column is "TRUE") which is a color intersection point (the "COLOR INTERSECTION POINT FLAG" column is "TRUE") and, if a relevant vector is found, starts processing from the relevant vector. Specifically, the CPU 7 considers the relevant vector as a starting point of a first dividing contour line and as a first contour point of the first dividing contour line, and changes the "UNUSED FLAG" column for the relevant vector to "FALSE". Then, referring to an outflow vector of the relevant vector, the CPU 7 considers the relevant vector as the following contour point of the first dividing contour line. If this contour point is not a color intersection point, the CPU 7 changes the "UNUSED FLAG" column for the relevant vector to "FALSE", and continues similar processing referring to the outflow vector of the relevant vector. On the other hand, if the relevant contour point is a color intersection point (the "COLOR INTERSECTION POINT FLAG" column is "TRUE"), the CPU 7 recognizes the relevant contour point as an ending point of the first dividing contour line. If the "UNUSED FLAG" column for this color intersection point has already been set to "FALSE", the CPU 7 recognizes that the processing has returned to the starting coordinate of the contour under extraction, and completes extraction for one closed loop. If the "UNUSED FLAG" column for this contour point is still "TRUE", the CPU 7 recognizes this contour point as a starting point of the following dividing contour line and as a first contour point of the new dividing contour line. The CPU 7 changes the "UNUSED FLAG" column for the relevant vector to "FALSE", and, similar to the previous dividing contour line, continues the operation for obtaining the following contour point on the relevant dividing contour line referring to the outflow vector. When extraction for one closed loop is completed, the CPU 7 searches again for an unprocessed vector (the "UNUSED FLAG" column is "TRUE") which is a color intersection point (the "COLOR INTERSECTION POINT FLAG" column is "TRUE") in the remaining closed loops. If a vector with which "COLOR INTERSECTION POINT FLAG" column is "TRUE" is not found in the vector information table, the CPU 7 starts processing from an unprocessed vector found first in the vector information table. The contour coordinates can be reconstructed by tracing the vector number of outflow vectors and sequentially recording x-y coordinates which have appeared. When the processing returns to the starting coordinate of the contour under extraction as a result of continuing the contour information reconstruction, the CPU 7 completes extraction for one closed loop. Continuing the processing until there remains no unprocessed vector enables extracting contour coordinates of all contours including outer and inner contours. The extracted contour information includes information on a label basis.

Reconstructing the contour information in step S1300 based on the vector information table illustrated in FIG. 14B obtained from the labeled image 140 illustrated FIG. 14A enables obtaining contour information as illustrated in FIG. 14C. The obtained contour information expresses the color region 1 (a region having the label number 1) as a set of partial contours each being sectioned by color intersection points. FIG. 14D illustrates an example of a data format indicating that the contour information illustrated in FIG. 14C constructs the contour of the region having the label number 1.

Applying section-based function approximation to data of boundary lines (dividing boundary lines) each being sectioned by color intersection points extracted in this way enables generating vector data without overlaps and gaps at each boundary between color regions.

The contour information reconstruction processing in step S1300 has specifically been described above. The processing in step S1300 implements the contour information reconstruction unit 104 illustrated in FIG. 1.

As described above, in the present exemplary embodiment, the CPU 7 raster-scans a labeled image and extracts linear elements constituting a contour of each label region using a window. The CPU 7 associates an extracted linear element with coordinate information (a starting point of the linear element) as well as with a destination and a source, and registers the linear element to the vector information table. When the starting point of the linear element is a color intersection point between color regions, the CPU 7 also records information about the color intersection point. After completion of scanning on the entire image, the CPU 7 connects a plurality of extracted linear elements referring to the vector information table. In this case, separating data to be connected at a portion having the color intersection point information enables extracting a boundary line. Therefore, since all of linear elements are registered in the vector information table in order of reconstruction, all of extractable boundary lines can be extracted in order suitable for contour reconstruction for a specific region. Since boundary lines can be extracted by raster-scanning the entire image once and scanning tables, high-speed processing is achieved. Further, linear element extraction and color intersection point determination are performed while shifting the window in order of raster scanning. Therefore, unlike boundary line extraction by tracing, the tracing direction remains unchanged by the region shape and memory cache effectively works, thus preventing processing speed reduction. Boundary lines can be extracted by raster-scanning the entire image once and scanning tables, regardless of the color region shape.

Figure 16A:
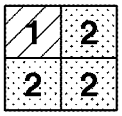
FIGS. 16A, 16B, 16C, 16D, 16E, 16F, 16G, 16H, 16I, 16J, 16K, 16L, 16M, 16N, 16O, 16P, 16Q, 16R, and 16S illustrate 4-pixel patterns possibly occurring in 2×2-pixel window scanning.

The window size is not limited to 3×3 and may be 2×2. Possible four-pixel patterns in a 2×2-pixel window in 2×2-pixel window scanning are illustrated in FIGS. 16A, 16D, 16G, 16K, and 16O. FIGS. 16A and 16D illustrate cases where pixels allocated two different labels exist in the 4-pixel window. FIGS. 16G and 16K illustrate cases where pixels allocated three different labels exist in the 4-pixel window.

Figure 16B:
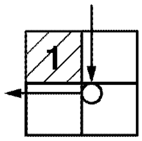
Figure 16C:
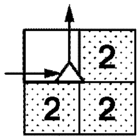
Figure 16D:
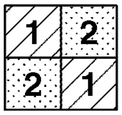
Figure 16E:
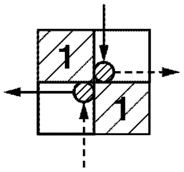
Figure 16F:
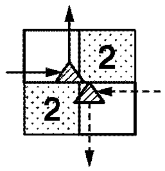
Figure 16G:
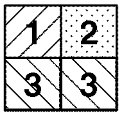
Figure 16H:
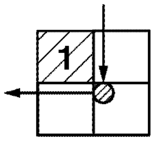
Figure 16I:
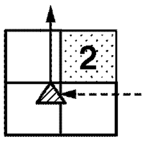
Figure 16J:
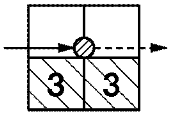
Figure 16K:
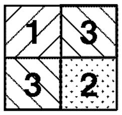
Figure 16L:
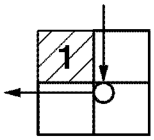
Figure 16M:
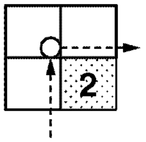
Figure 16N:
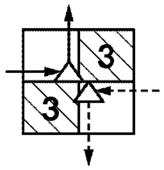
Figure 16O:
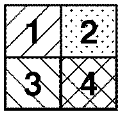
Figure 16P:
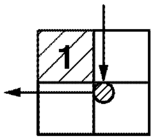
Figure 16Q:
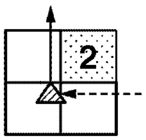
Figure 16R:
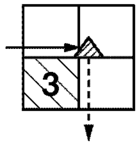
Figure 16S:
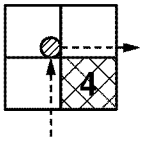

FIG. 16O illustrates a case where pixels allocated four different labels exist in the 4-pixel window. In cases where pixels allocated only one label exist in the 4-pixel window are not illustrated because a contour point is not extracted. Basically, although there are patterns obtained by rotating each pattern by 90, 180, and 270 degrees, these patterns can be easily covered by illustrating cases illustrated in FIGS. 16A, 16D, 16G, 16K, and 16O, and detailed description thereof will be omitted. Cases illustrated in FIGS. 16A, 16D, 16G, 16K, and 16O will be described below.

In the descriptions of 3×3-pixel window scanning according to the above-described exemplary embodiment, a case for extracting contour vector information about all of labels appearing in the labeled image by scanning the labeled image once has specifically been described. In the descriptions, a case for preparing, for all of labels appearing in the labeled image, vector information tables and tables for managing information about vectors having an undetermined inflow or outflow vector for respective label regions has specifically been described. These cases are also applicable to 2×2-pixel window scanning.

In the case of the pattern illustrated in FIG. 16A, the CPU 7 extracts one contour point which is not a color intersection point for each of two different labels as illustrated in FIGS. 16B and 16C. In the case of the pattern illustrated in FIG. 16D, the CPU 7 extracts two contour points which are color intersection points for each of two different labels as illustrated in FIGS. 16E and 16F. In the case of the pattern illustrated in FIG. 16G, the CPU 7 extracts one contour point which is a color intersection point for each of three different labels as illustrated in FIGS. 16H, 16I, and 16J. In the case of the pattern illustrated in FIG. 16K, the CPU 7 extracts one contour point which is not a color intersection point for a label allocated to only one of four pixels, out of three different labels (corresponding to FIGS. 16L and 16M), and extracts two contour points which are not color intersection points for a label allocated to two pixels adjacently existing at diagonal positions out of four pixels (corresponding to FIG. 16N), as illustrated in FIGS. 16L, 16M, and 16N. In the case of the pattern illustrated in FIG. 16O, the CPU 7 extracts one contour point which is a color intersection point for each of four different labels as illustrated in FIGS. 16P, 16Q, 16R, and 16S.

The above-described configuration enables, even in 2×2-pixel window scanning, extracting contour information completely equivalent to contour the information acquired in 3×3-pixel window scanning.

In the case of a 3×3-pixel window, to extract contour information of all of label regions in a labeled image by raster-scanning the labeled image once, it is useful to extract only the label of the center pixel as described in the first exemplary embodiment. On the other hand, the case of a 2×2-pixel window largely differs from the case of a 3×3-pixel window in that it is necessary to extract contour information for all of labels appearing in four pixels in the window.

Even in the case of 2×2-pixel window scanning, it is also possible to extract only a contour point corresponding to a certain label, out of the above-described contour point extraction, only to one corresponding table area, by raster-scanning the labeled image once. Even in 2×2-pixel window scanning, repeating similar raster scanning while changing the number of labels existing in the image and the label subjected to contour extraction enables extracting contour information for each label. This case eliminates the need of allocating memory areas for vector information tables and tables for managing information about vectors having an undetermined inflow or outflow vector for all of labels.

An exemplary embodiment of the present invention has specifically been described above. Many of processing in the exemplary embodiment is implemented by a computer program executed on an information processing apparatus and, therefore, the computer program is also considered to be included in the scope of the present invention. Regularly, a computer program is stored in the RAM 5, ROM 6, or a computer-readable storage media such as a compact disc read-only memory (CD-ROM), and can be executed by setting the storage medium in a computer and then copying or installing the computer program in a system. Therefore, the computer-readable storage medium is also considered to be included in the scope of the present invention.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-263422 filed Dec. 1, 2011, which is hereby incorporated by reference herein in its entirety.

What is claimed is:

1. An image processing apparatus comprising:

a color intersection point determination and contour point extraction unit configured to raster-scan a multivalued image by using a pixel matrix having a predetermined size, to determine whether a target point is a color intersection point for dividing a contour which represents a boundary between pixels having different values from each other, according to states of a plurality of pixels in the pixel matrix, and to extract a contour point defining the contour which represents the boundary between the pixels having different values from each other; and a contour information reconstruction unit configured to, by using color intersection points determined by the color intersection point determination and contour point extraction unit and contour points extracted by the color intersection point determination and contour point extraction unit, generate contour information including contour lines each being sectioned by the color intersection points.

2. The image processing apparatus according to claim 1, wherein the color intersection point determination and contour point extraction unit includes:

a color intersection point determination unit configured to determine whether a target point is a color intersection point at which a contour which represents a boundary between pixels having different values from each other is to be sectioned, according to states of the plurality of pixels in the pixel matrix; and a contour point extraction unit configured to extract a contour point defining the contour which represents a boundary between pixels having different values from each other, according to states of the plurality of pixels in the pixel matrix and a result of the determination by the color intersection point determination unit.

3. The image processing apparatus according to claim 1, wherein the color intersection point refers to a point at which a plurality of pixels having three or more different values contact, or a point at which a plurality of colors contact, diagonally adjacent pixels have an identical value, and horizontally or vertically adjacent pixels have a different value from each other.

4. The image processing apparatus according to claim 1, wherein the pixel matrix is a matrix having a 3×3-pixel size.

5. The image processing apparatus according to claim 4, wherein the color intersection point determination and contour point extraction unit extracts a contour point constituting a contour of a region of pixels having identical values to a center pixel of 3×3 pixels included in the pixel matrix.

6. The image processing apparatus according to claim 1, wherein the pixel matrix is a matrix having a 2×2-pixel size.

7. The image processing apparatus according to claim 1, further comprising a region number allocation unit configured to allocate an identical region number to each of pixels determined to have identical colors to generate the multivalued image for an input image.

8. The image processing apparatus according to claim 7, wherein the input image is formed by eliminating noise from an image input through scanning.

9. The image processing apparatus according to claim 1, further comprising a function approximation unit configured to apply function approximation to the contour information including contour lines each being sectioned by the color intersection points, generated by the contour information reconstruction unit, for each of the sectioned contour lines.

10. An image processing method comprising:

raster-scanning a multivalued image by using a pixel matrix having a predetermined size, determining whether a target point is a color intersection point for dividing a contour which represents a boundary between pixels having different values from each other, according to states of a plurality of pixels in the pixel matrix, and extracting a contour point defining the contour which represents the boundary between the pixels having different values from each other; and generating contour information including contour lines each being sectioned by the color intersection points, by using the determined color intersection points and the extracted contour points.

11. A non-transitory computer-readable medium storing a computer program that causes a computer to function as:

a color intersection point determination and contour point extraction unit configured to raster-scan a multivalued image by using a pixel matrix having a predetermined size, to determine whether a target point is a color intersection point for dividing a contour which represents a boundary between pixels having different values from each other, according to states of a plurality of pixels in the pixel matrix, and to extract a contour point defining the contour which represents the boundary between the pixels having different values from each other; and a contour information reconstruction unit configured to, by using color intersection points determined by the color intersection point determination and contour point extraction unit and contour points extracted by the color intersection point determination and contour point extraction unit, generate contour information including contour lines each being sectioned by the color intersection points.

* * * * *